United States Patent
Lee et al.

(10) Patent No.: US 11,057,876 B2
(45) Date of Patent: Jul. 6, 2021

(54) DOWNLINK CONTROL FOR MULTIPLE TRANSMIT RECEIVE POINT CONFIGURATIONS

(71) Applicant: QUALCOMM Incorporated, San Diego, CA (US)

(72) Inventors: Heechoon Lee, San Diego, CA (US); Peter Gaal, San Diego, CA (US); Alexandros Manolakos, San Diego, CA (US); Gabi Sarkis, San Diego, CA (US); Wanshi Chen, San Diego, CA (US); Jing Sun, San Diego, CA (US); Tao Luo, San Diego, CA (US); Juan Montojo, San Diego, CA (US); Makesh Pravin John Wilson, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/457,264

(22) Filed: Jun. 28, 2019

(65) Prior Publication Data

US 2020/0029310 A1 Jan. 23, 2020

(30) Foreign Application Priority Data

Jul. 20, 2018 (GR) .............................. 20180100332

(51) Int. Cl.
*H04W 4/00* (2018.01)
*H04W 72/04* (2009.01)

(52) U.S. Cl.
CPC ................................ *H04W 72/042* (2013.01)

(58) Field of Classification Search
None
See application file for complete search history.

(56) References Cited

U.S. PATENT DOCUMENTS

2018/0343653 A1* 11/2018 Guo ...................... H04L 5/0053
2019/0069285 A1* 2/2019 Chandrasekhar .... H04B 7/0695
(Continued)

FOREIGN PATENT DOCUMENTS

WO 2019031850 A1 2/2019

OTHER PUBLICATIONS

CMCC: "Discussion on PDCCH Blind Decoding Dropping Rule", 3GPP Draft; R1-1804098, 3rd Generation Partnership Project (3GPP), Mobile Competence Centre; 650, Route Des Lucioles; F-06921 Sophia-Antipolis Cedex ; France, vol. RAN WG1, No. Sanya. China; 20180416-20180420 Apr. 15, 2018, XP051426387, Retrieved from the Internet: URL:http://www.3gpp.org/ftp/Meetings%5F3GPP%5FSYNC/RAN1/Docs/ [retrieved on Apr. 15, 2018], section 2, 4 pages.

(Continued)

*Primary Examiner* — Clemence S Han
(74) *Attorney, Agent, or Firm* — Harrity & Harrity, LLP\Qualcomm

(57) ABSTRACT

Various aspects of the present disclosure generally relate to wireless communication. In some aspects, a user equipment may receive an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively perform, based at least in part on a configuration, at least one of: independent decoding of the first PDCCH candidate, independent decoding of the second PDCCH candidate, or joint decoding of the first PDCCH candidate and the second PDCCH candidate. Numerous other aspects are provided.

30 Claims, 11 Drawing Sheets

(56) References Cited

U.S. PATENT DOCUMENTS

| | | | | |
|---|---|---|---|---|
| 2019/0140776 A1* | 5/2019 | Seo | | H04L 5/0048 |
| 2019/0141691 A1* | 5/2019 | Kwon | | H04W 72/046 |
| 2019/0150123 A1* | 5/2019 | Nogami | | H04W 72/042 |
| | | | | 370/330 |
| 2019/0150124 A1* | 5/2019 | Nogami | | H04W 72/0446 |
| | | | | 370/330 |
| 2019/0158205 A1* | 5/2019 | Sheng | | H04L 5/0048 |
| 2019/0190582 A1* | 6/2019 | Guo | | H04B 7/088 |
| 2019/0222357 A1* | 7/2019 | Huang | | H04L 5/0053 |
| 2019/0239093 A1* | 8/2019 | Zhang | | H04L 5/001 |
| 2019/0246395 A1* | 8/2019 | Huang | | H04L 5/0003 |
| 2019/0253308 A1* | 8/2019 | Huang | | H04W 72/0466 |
| 2019/0281587 A1* | 9/2019 | Zhang | | H04L 5/0044 |
| 2019/0306700 A1* | 10/2019 | Lin | | H04W 74/0833 |
| 2019/0313429 A1* | 10/2019 | Cheng | | H04W 48/12 |
| 2019/0349964 A1* | 11/2019 | Liou | | H04W 72/1284 |
| 2019/0379506 A1* | 12/2019 | Cheng | | H04B 7/0695 |
| 2020/0007296 A1* | 1/2020 | Papasakellariou | | H04W 72/044 |
| 2020/0029315 A1* | 1/2020 | Lin | | H04L 5/0091 |
| 2020/0120584 A1* | 4/2020 | Yi | | H04L 5/0048 |
| 2020/0178239 A1* | 6/2020 | Yi | | H04W 76/27 |
| 2020/0196343 A1* | 6/2020 | Marinier | | H04L 1/1854 |
| 2020/0267571 A1* | 8/2020 | Park | | H04W 72/046 |

OTHER PUBLICATIONS

Ericsson: "On Beam Indication, Measurement and Reporting", 3GPP Draft; R1-1718433 on Beam Indication, Measurement and Reporting, 3rd Generation Partnership Project (3GPP), Mobile Competence Centre; 650, Route Des Lucioles; F-06921 Sophia-Antipolis Cedex ; France, vol. RAN WG1, No. Prague, Czech Republic; 20171009-20171013 Oct. 8, 2017, XP051341615, Retrieved from the Internet: URL:http://www.3gpp.org/ftp/Meetings_3GPP_SYNC/RAN1/Docs/ [retrieved on Oct. 8, 2017] section 2; figure 1, 9 pages.

Etri: "PDCCH Design for Multi-Beam Operation", 3GPP TSG RAN WG1 Meeting #91, 3GPP Draft; R1-1720231 PDCCH Design for Multi-Beam Operation—Final, 3rd Generation Partnership Project (3GPP), Mobile Competence Centre; 650, Route Des Lucioles; F-06921 Sophia-Antipolis Cedex ; France, vol. RAN WG1, No. Reno, USA; 20171127-20171201, Nov. 18, 2017 (Nov. 18, 2017), pp. 1-6, XP051369867, Retrieved from the Internet: URL: http://www.3gpp.org/ftp/tsg%5Fran/WG1%5FRL1/TSGR1%5F91/Docs/ [retrieved on Nov. 18, 2017].

International Search Report and Written Opinion—PCT/US2019/040176—ISA/EPO—dated Oct. 1, 2019.

Zte: "Remaining Aspects for Rate Matching", 3GPP TSG RAN WG1 Meeting #93, 3GPP Draft; R1-1806136 Remaining Aspects for Rate Matching, 3rd Generation Partnership Project (3GPP), Mobile Competence Centre; 650, Route Des Lucioles; F-06921 Sophia-Antipolis Cedex ; France, vol. RAN WG1, No. Busan. Korea; 20180521-20180525 May 20, 2018, XP051441346, Retrieved from the Internet: URL: http://www.3gpp.org/ftp/Meetings_3GPP_SYNC/RAN1/Docs/ [retrieved on May 20, 2018], sections 2 and 4, 3 Pages.

* cited by examiner

DOWNLINK CONTROL FOR MULTIPLE TRANSMIT RECEIVE POINT CONFIGURATIONS

CROSS-REFERENCE TO RELATED APPLICATIONS UNDER 35 U.S.C. § 119

This application claims priority to Greek Patent Application No. 20180100332, filed on Jul. 20, 2018, entitled "TECHNIQUES AND APPARATUSES FOR DOWNLINK CONTROL FOR MULTIPLE TRANSMIT RECEIVE POINT CONFIGURATIONS," which is hereby expressly incorporated by reference herein.

FIELD OF THE DISCLOSURE

Aspects of the present disclosure generally relate to wireless communication and to techniques and apparatuses for downlink control for multiple transmit receive point (TRP) configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively performing, based at least in part on a configuration, at least one of: independent decoding of the first PDCCH candidate, independent decoding of the second PDCCH candidate, or joint decoding of the first PDCCH candidate and the second PDCCH candidate.

In some aspects, a UE for wireless communication may include memory and one or more processors operatively coupled to the memory. The memory and the one or more processors may be configured to receive an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively perform, based at least in part on a configuration, at least one of: independent decoding of the first PDCCH candidate, independent decoding of the second PDCCH candidate, or joint decoding of the first PDCCH candidate and the second PDCCH candidate.

In some aspects, a non-transitory computer-readable medium may store one or more instructions for wireless communication. The one or more instructions, when executed by one or more processors of a UE, may cause the one or more processors to receive an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively perform, based at least in part on a configuration, at least one of: independent decoding of the first PDCCH candidate, independent decoding of the second PDCCH candidate, or joint decoding of the first PDCCH candidate and the second PDCCH candidate.

In some aspects, an apparatus for wireless communication may include means for receiving an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and means for selectively performing, based at least in part on a configuration, at least one of: independent decoding of the first PDCCH candidate, independent decoding of the second PDCCH candidate, or joint decoding of the first PDCCH candidate and the second PDCCH candidate.

In some aspects, a method of wireless communication, performed by a base station, may include transmitting an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively transmitting, based at least in part on a configuration, on the first PDCCH candidate, on the second PDCCH candidate, or on both the first PDCCH candidate and the second PDCCH candidate.

In some aspects, a base station for wireless communication may include memory and one or more processors operatively coupled to the memory. The memory and the one or more processors may be configured to transmit an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively transmit, based at least in part on a configuration, on the first PDCCH candidate, on the second PDCCH candidate, or on both the first PDCCH candidate and the second PDCCH candidate.

In some aspects, a non-transitory computer-readable medium may store one or more instructions for wireless communication. The one or more instructions, when executed by one or more processors of a base station, may cause the one or more processors to transmit an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively transmit, based at least in part on a configuration, on the first PDCCH candidate, on the second PDCCH candidate, or on both the first PDCCH candidate and the second PDCCH candidate.

In some aspects, an apparatus for wireless communication may include means for transmitting an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and means for selectively transmitting, based at least in part on a configuration, on the first PDCCH candidate, on the second PDCCH candidate, or on both the first PDCCH candidate and the second PDCCH candidate.

Aspects generally include a method, apparatus, system, computer program product, non-transitory computer-readable medium, user equipment, base station, transmit receive point (TRP), wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
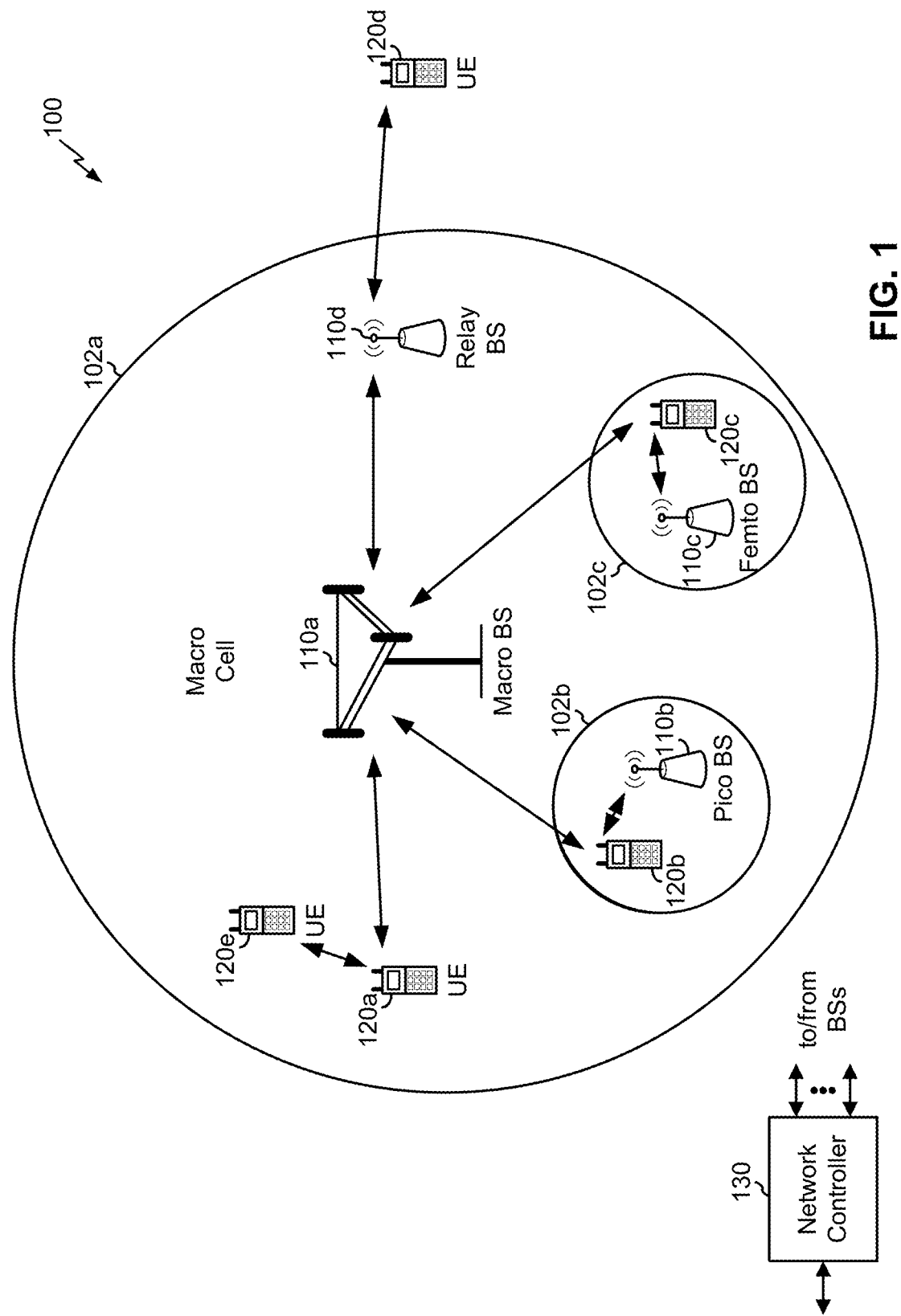
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
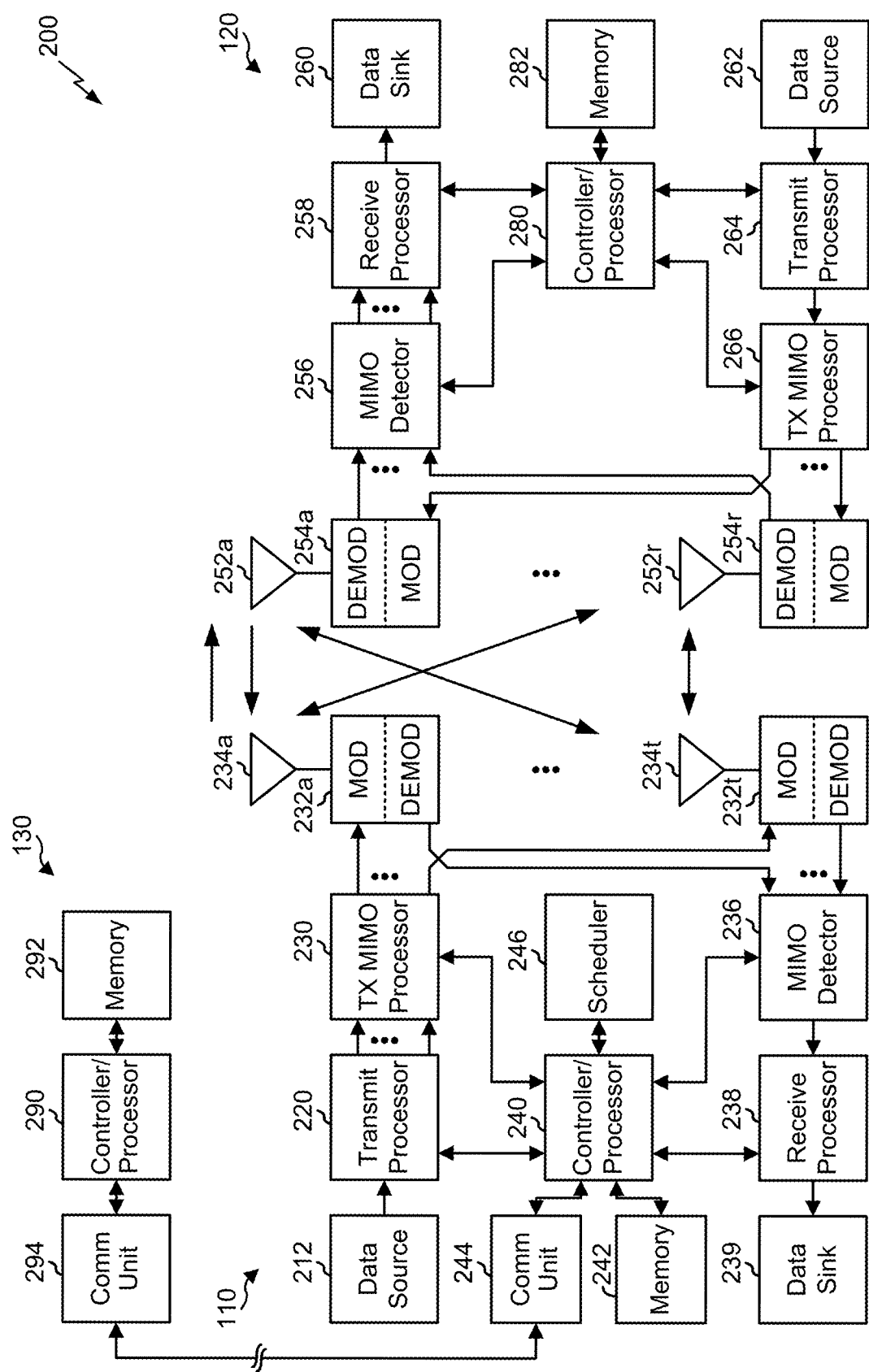
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with downlink control for multiple transmit receive point (TRP) configurations, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; means for selectively performing, based at least in part on a configuration, at least one of: independent decoding of the first PDCCH candidate, independent decoding of the second PDCCH candidate, or joint decoding of the first PDCCH candidate and the second PDCCH candidate; and/or the like. In some aspects, such means may include one or more components of UE 120 described in connection with FIG. 2.

In some aspects, base station 110 may include means for transmitting an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; means for selectively transmitting, based at least in part on a configuration, on the first PDCCH candidate, on the second PDCCH candidate, or on both the first PDCCH candidate and the second PDCCH candidate; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
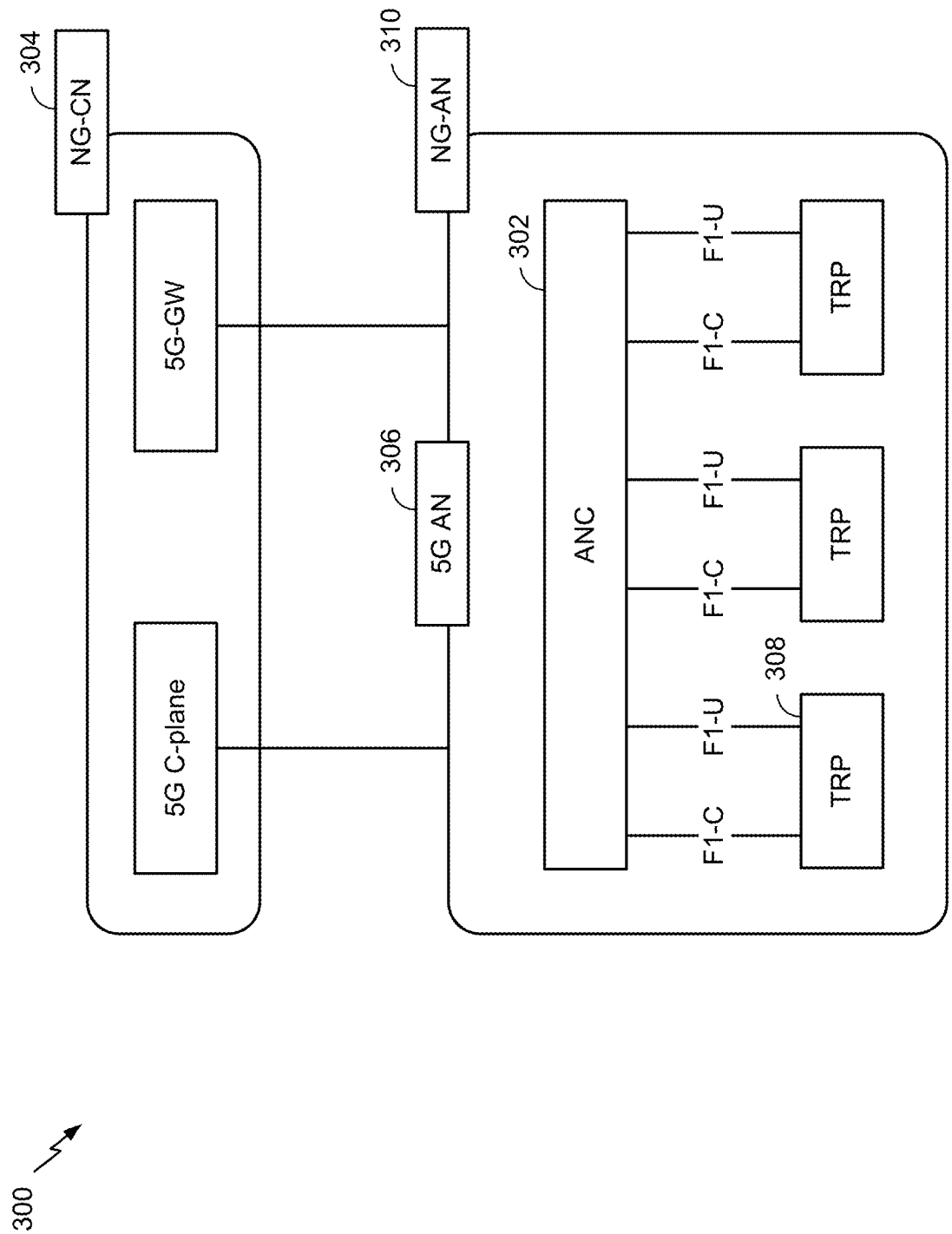
FIG. 3 illustrates an example logical architecture of a distributed radio access network (RAN), in accordance with various aspects of the present disclosure.

FIG. 3 illustrates an example logical architecture of a distributed RAN 300, according to various aspects of the present disclosure.

A 5G access node 306 may include an access node controller (ANC) 302. The ANC 302 may be a central unit (CU) of the distributed RAN 300. The backhaul interface to the next generation core network (NG-CN) 304 may terminate at the ANC 302. The backhaul interface to neighboring next generation access nodes (NG-ANs) may terminate at the ANC 302. The ANC 302 may include one or more TRPs 308 (which may also be referred to as BSs, NR BSs, Node Bs, 5G NBs, APs, gNB, or some other term). As described above, a TRP 308 may be used interchangeably with "cell." In some aspects, multiple TRPs 308 may be included in a single base station 110. Additionally, or alternatively, different TRPs 308 may be included in different base stations 110.

A TRP 308 may be a distributed unit (DU). A TRP 308 may be connected to a single ANC 502 or multiple ANCs 302. For example, for RAN sharing, radio as a service (RaaS), and service specific AND deployments, a TRP 308 may be connected to more than one ANC 302. A TRP 308 may include one or more antenna ports. The TRPs 308 may be configured to individually (e.g., dynamic selection) or jointly (e.g., joint transmission) serve traffic to a UE 120.

The local architecture of RAN 300 may be used to illustrate fronthaul definition. The architecture may be defined that supports fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR. The architecture may enable coordination between and among TRPs 308. For example, coordination may be preset within a TRP 308 and/or across TRPs 308 via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), media access control (MAC) protocol may be adaptably placed at the ANC 302 or TRP 308. According to various aspects, a base station 110 may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
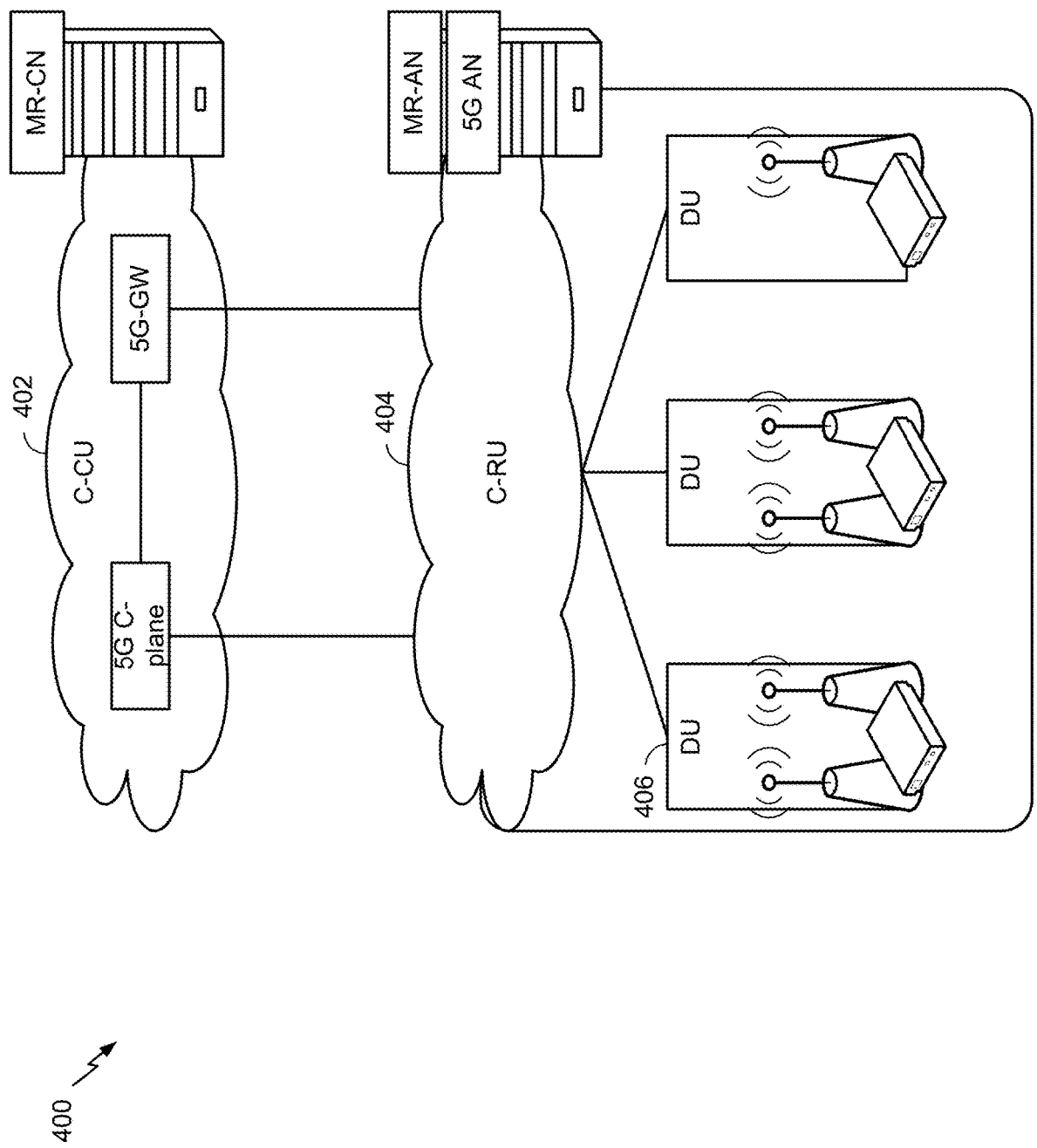
FIG. 4 illustrates an example physical architecture of a distributed RAN, in accordance with various aspects of the present disclosure.

FIG. 4 illustrates an example physical architecture of a distributed RAN 400, according to aspects of the present disclosure.

A centralized core network unit (C-CU) 402 may host core network functions. The C-CU 402 may be centrally deployed. Functionality of the C-CU may be offloaded (e.g., to advanced wireless services (AWS)), in an effort to handle peak capacity. A centralized RAN unit (C-RU) 404 may host one or more ANC functions. Optionally, the C-RU 404 may host core network functions locally. The C-RU 404 may have distributed deployment. The C-RU 404 may be closer to the network edge. A distributed unit (DU) 406 may host one or more TRPs 308. The DU 406 may be located at edges of the network with radio frequency (RF) functionality.

As indicated above, FIG. 4 is provided merely as an example. Other examples are possible and may differ from what was described with regard to FIG. 4.

Figure 5:
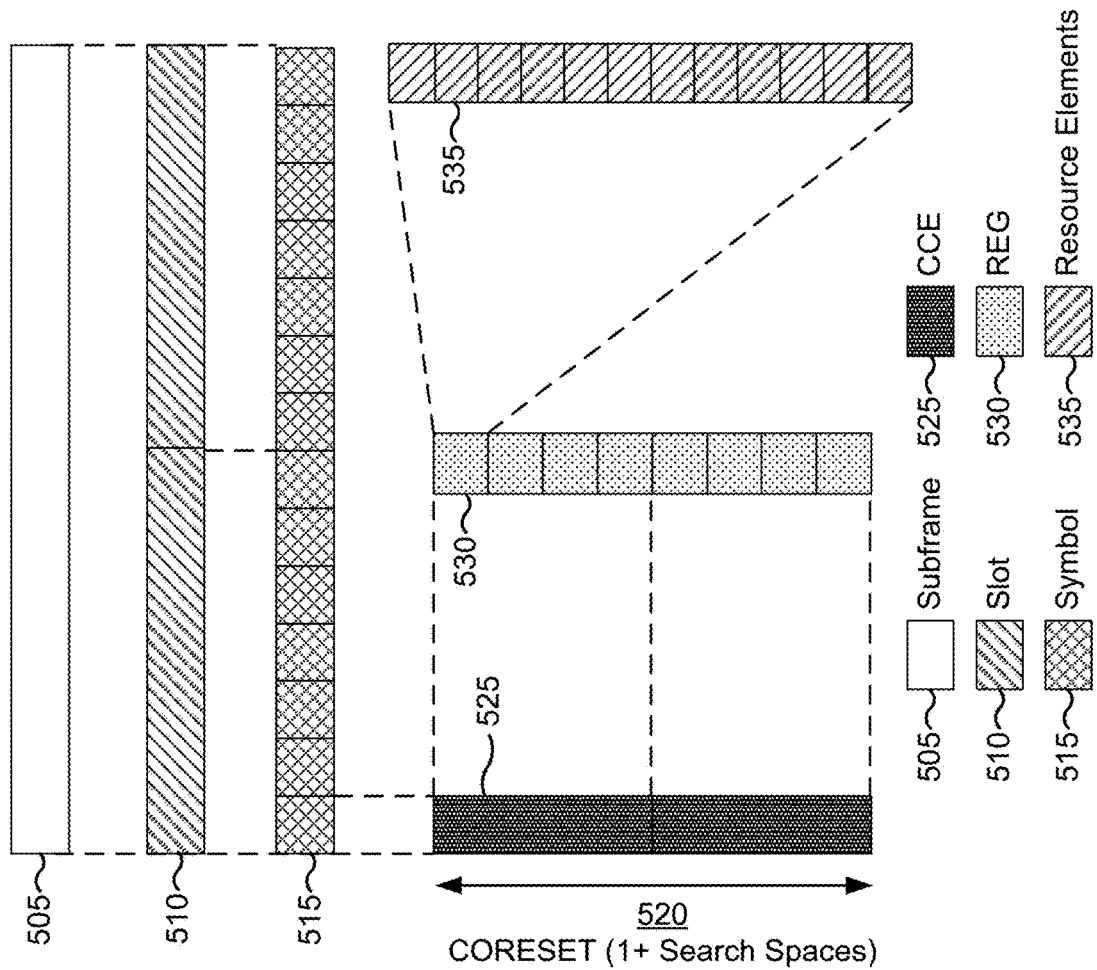
FIG. 5 illustrates an example resource structure for wireless communication, in accordance with various aspects of the present disclosure.

FIG. 5 illustrates an example resource structure 500 for wireless communication, in accordance with various aspects of the present disclosure. Resource structure 500 shows an example of various groups of resources described herein. As shown, resource structure 500 may include a subframe 505. Subframe 505 may include multiple slots 510. While resource structure 500 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 510 may include multiple symbols 515, such as 7 symbols or 14 symbols per slot.

The potential control region of a slot 510 may be referred to as a control resource set (CORESET) 520, and may be structured to support an efficient use of resources, such as by flexible configuration or reconfiguration of resources of the CORESET 520 for one or more physical downlink control channels (PDCCHs), one or more physical downlink shared channels (PDSCHs), and/or the like. In some aspects, the CORESET 520 may occupy the first symbol 515 of a slot 510, the first two symbols 515 of a slot 510, or the first three symbols 515 of a slot 510. Thus, a CORESET 520 may include multiple resource blocks in the frequency domain, and either one, two, or three symbols 515 in the time domain. In 5G, a number of resources included in the CORESET 520 may be flexibly configured, such as by using radio resource control (RRC) signaling to indicate a frequency domain region (e.g., a number of resource blocks) and/or a time domain region (e.g., a number of symbols) for the CORESET 520.

As illustrated, a symbol 515 that includes CORESET 520 may include one or more control channel elements (CCEs) 525, shown as two CCEs 525 as an example, that span a portion of the system bandwidth. A CCE 525 may include downlink control information (DCI) that is used to provide control information for wireless communication. A base station may transmit DCI during multiple CCEs 525 (as shown), where the number of CCEs 525 used for transmission of DCI represents the aggregation level used by the base station for the transmission of DCI. In FIG. 5, an aggregation level of two is shown as an example, corresponding to two CCEs 525 in a slot 510. In some aspects, different aggregation levels may be used, such as 1, 4, 8, 16, and/or the like.

Each CCE 525 may include a fixed number of resource element groups (REGs) 530, shown as four REGs 530, or may include a variable number of REGs 530. In some aspects, the number of REGs 530 included in a CCE 525 may be specified by a REG bundle size. A REG 530 may include one resource block, which may include 12 resource elements (REs) 535 within a symbol 515. A resource element 535 may occupy one subcarrier in the frequency domain and one OFDM symbol in the time domain.

A CORESET 520 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. Similarly, the set of all possible PDCCH locations for a particular group of UEs may be referred to as a group-common search space.

As shown by reference number 540, multiple TRPs (shown as TRP A and TRP B) may communicate with the same UE in a coordinated manner (e.g., using coordinated multipoint transmissions and/or the like) to improve reliability, increase throughput, and/or the like. The TRPs may coordinate such communications via a backhaul, which may have a smaller delay when the TRPs are co-located at the same base station (e.g., different antenna arrays of the same base station), or may have a larger delay when the TRPs are located at different base stations. As shown, different TRPs may communicate control information to the UE using different CORESETs 520. Some techniques and apparatuses described herein provide diversity gain using non-coherent joint transmissions from multiple TRPs, and permit a UE to selectively combine joint transmission from multiple TRPs with relatively low complexity.

As indicated above, FIG. 5 is provided merely as an example. Other examples are possible and may differ from what was described with regard to FIG. 5.

Figure 6:
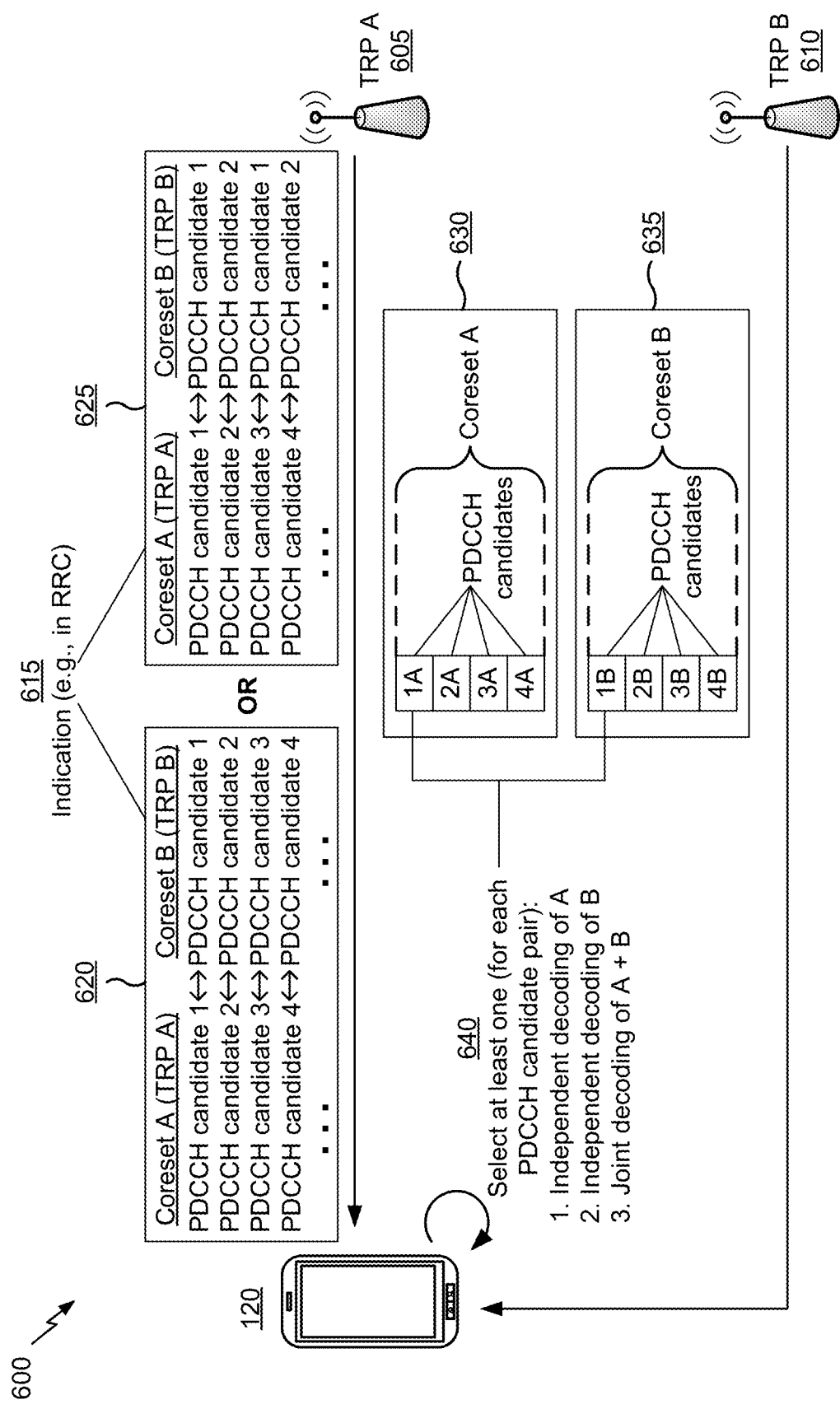
FIGS. 6-9 are diagrams illustrating examples relating to downlink control for multiple transmit receive point (TRP) configurations, in accordance with various aspects of the present disclosure.

FIG. 6 is a diagram illustrating an example 600 relating to downlink control for multiple TRP configurations, in accordance with various aspects of the present disclosure.

As shown in FIG. 6, a UE 120 may communicate with a first TRP 605 (shown as TRP A) and a second TRP 610 (shown as TRP B), such as in a coordinated multipoint communication scheme. As described elsewhere herein, a TRP 605, 610 may correspond to a base station 110, an antenna array of a base station 110, and/or the like. In some aspects, the first TRP 605 and the second TRP 610 may be part of the same base station 110 and/or cell (e.g., different antenna arrays of the same base station 110). In some aspects, the first TRP 605 and the second TRP 610 may be separate base stations 110 and/or cells.

As shown by reference number 615, a TRP (e.g., shown as the first TRP 605, but which could be the second TRP 610) may transmit, and the UE 120 may receive, an indication of multiple pairs of corresponding PDCCH candidates. In some aspects, the indication is included in an RRC message. A pair of PDCCH candidates may include a first PDCCH candidate included in a first CORESET (shown as CORESET A) and a corresponding second PDCCH candidate included in a second CORESET (shown as CORESET B). In some aspects, the first CORESET may be associated with the first TRP 605 (e.g., may be used by the first TRP 605 to transmit DCI), and the second CORESET may be associated with the second TRP 610 (e.g., may be used by the second TRP 610 to transmit DCI). Additionally, or alternatively, the first CORESET and the second CORESET may have different transmission configuration indication (TCI) states that indicate different quasi-colocation assumptions, different beamforming states, and/or different beamforming parameters between the first CORESET and the second CORESET.

For example, as shown by reference number 620, the indication may indicate that PDCCH candidate 1 from CORESET A and PDCCH candidate 1 from CORESET B correspond to one another, that PDCCH candidate 2 from CORESET A and PDCCH candidate 2 from CORESET B correspond to one another, that PDCCH candidate 3 from CORESET A and PDCCH candidate 3 from CORESET B correspond to one another, and that that PDCCH candidate 4 from CORESET A and PDCCH candidate 4 from CORESET B correspond to one another. In this example, the PDCCH candidates in CORESET A and CORESET B are associated with the same aggregation level (e.g., four), and CORESET A and CORESET B include the same number of PDCCH candidates (e.g., four). In this case, each PDCCH candidate from CORESET A maps to one respective PDCCH candidate from CORESET B, and each PDCCH candidate from CORESET B maps to one respective PDCCH candidate from CORESET A. In other words, there is a one-to-one mapping of PDCCH candidates between CORESET A and CORESET B. In some aspects, and as shown, PDCCH candidates with matching indices from both CORESETs may be included in the same PDCCH candidate pair.

As another example, as shown by reference number 625, the indication may indicate that PDCCH candidate 1 from CORESET A and PDCCH candidate 1 from CORESET B correspond to one another, that PDCCH candidate 2 from CORESET A and PDCCH candidate 2 from CORESET B correspond to one another, that PDCCH candidate 3 from CORESET A and PDCCH candidate 1 from CORESET B correspond to one another, and that that PDCCH candidate 4 from CORESET A and PDCCH candidate 2 from CORESET B correspond to one another. In this example, the PDCCH candidates in CORESET A and CORESET B are associated with different aggregation levels (e.g., four and two, respectively), and CORESET A and CORESET B include a different number of PDCCH candidates (e.g., four and two, respectively). In this case, one or more PDCCH candidates from CORESET A map to multiple PDCCH candidates from CORESET B. In other words, there is a one-to-many mapping of PDCCH candidates between CORESET A and CORESET B. In some aspects, and as shown, after all of the PDCCH candidates from the CORESET with the smaller aggregation level have been paired with a PDCCH candidate from the CORESET with the larger aggregation level, the pairing of PDCCH candidates may wrap around to a first PDCCH candidate of the CORESET with the smaller aggregation level.

In some aspects, the same aggregation level may be used for PDCCHs in both CORESETs because some aggregation levels and DCI size candidates are not combinable. For example, if a first aggregation level is used for a first PDCCH, and a second aggregation level is used for a second PDCCH, a particular DCI size and/or format may not be compatible with both aggregation levels. In some aspects, the TRP(s) may configure the PDCCHs across CORESETs to use the same aggregation level, thereby eliminating such incompatibility. Additionally, or alternatively, the TRP(s) may select a DCI size and/or format that is compatible with both aggregation levels.

By indicating corresponding PDCCH candidates for joint transmissions on different CORESETs, as described above, decoding complexity may be reduced as compared to permitting any combination of PDCCH candidates for joint transmissions on the different CORESETs. For example, if CORESET A includes M PDCCH candidates and CORESET B includes N PDCCH candidates (e.g., where M>N), then M×N pairs of PDCCH candidates may exist, as compared to M pairs of PDCCH candidates when the techniques described herein are used.

As shown by reference number 630, the first TRP 605 may communicate with the UE 120 using CORESET A. For example, the first TRP 605 may identify a PDCCH candidate, on CORESET A, to be used for a PDCCH, and for transmission of DCI on the PDCCH. The four PDCCH candidates of example 600 are shown in CORESET A as 1A, 2A, 3A, and 4A. Similarly, as shown by reference number 635, the second TRP 610 may communicate with the UE 120 using CORESET B. For example, the second TRP 610 may identify a PDCCH candidate, on CORESET B, to be used for a PDCCH, and for transmission of DCI on the PDCCH. The four PDCCH candidates of example 600 are shown in CORESET B as 1B, 2B, 3B, and 4B.

The PDCCH candidates on CORESET A and CORESET B may be selected such that DCI for a joint transmission is transmitted on a pair of corresponding PDCCH candidates, indicated to the UE 120 as described above in connection with reference numbers 615-625. In this way, complexity for the UE 120 may be reduced by reducing a number of pairs of PDCCH candidates to be blindly decoded by the UE 120. In some aspects, the DCI transmitted on the pair of corresponding PDCCH candidates may be the same. For example, the same information bits of DCI (but possibly different parity bits for different redundancy versions) may be transmitted on the pair of corresponding PDCCH candidates. By using joint transmission of DCI on different CORESETs with different TCI states (e.g., for non-coherent joint transmission), spatial diversity may be increased, thereby increasing a likelihood of successful reception of the DCI by the UE 120, which may improve reliability, reduce latency, increase throughput, and/or the like.

In some aspects, the first TRP 605 and/or the second TRP 610 may coordinate whether to transmit only on a PDCCH candidate on CORESET A, only on a corresponding PDCCH candidate on CORESET B, on both the first PDCCH candidate and the second PDCCH candidate, or on neither of the first PDCCH candidate or the second PDCCH candidate (e.g., when there is no DCI and/or data to transmit for the UE 120, when a different PDCCH candidate pair is selected, and/or the like). For example, the determination of which PDCCH candidates to be used to transmit DCI on a PDCCH may be based at least in part on radio conditions (e.g., determined by performing radio link monitoring of a radio link between the UE 120 and the first TRP 605, a radio link between the UE 120 and the second TRP 610, and/or the like). For example, if radio conditions are good on the link between the UE 120 and the first TRP 605 and are also good on the link between the UE 120 and the second TRP 610, then the TRPs may jointly transmit DCI. However, if radio conditions are good on only one of the links, then the TRP associated with that link may transmit DCI, and the other TRP may not transmit DCI.

In some aspects, one or both TRPs may transmit a decoding configuration that indicates whether the UE 120 is to independently decode the first PDCCH candidate, independently decode the second PDCCH candidate, jointly decode the first PDCCH candidate and the second PDCCH candidate, or some combination thereof. In some aspects, the decoding configuration may be semi-statically configured (e.g., via RRC). Additional details are described below in connection with FIG. 7.

As shown by reference number 640, the UE 120 may selectively perform at least one of independent decoding of a first PDCCH candidate of a PDCCH candidate pair, independent decoding of a second PDCCH candidate of a PDCCH candidate pair, or joint decoding of both the first PDCCH candidate and the second PDCCH candidate. In some aspects, the UE 120 may determine which of these decoding options to perform based at least in part on a configuration (e.g., a decoding configuration), as described in more detail below in connection with FIG. 7.

In some aspects, resources of a physical uplink control channel (PUCCH) may be implicitly indicated and/or determined based at least in part on one of the PDCCHs corresponding to one of the PDCCH candidates in a pair of PDCCH candidates. For example, a timing of a PUCCH may depend on a timing of a corresponding PDCCH (e.g., a particular number of slots after the PDCCH). However, when multiple PDCCHs are used, the timings of the multiple PDCCHs may differ. In some cases, the PDCCH to be used for PUCCH timing may be the PDCCH corresponding to the PDCCH candidate that is indicated first in the PDCCH candidate pair. For example, if PDCCH candidate 1A is indicated before PDCCH candidate 1B in an RRC message, then the PDCCH corresponding to PDCCH candidate 1A may be used to determine resources for the PUCCH. In some aspects, the PDCCH that occurs earlier in time may be used to determine resources for the PUCCH. In some aspects, the PDCCH that occurs later in time may be used to determine resources for the PUCCH. In this way, hybrid automatic repeat request (HARD) acknowledgement (ACK) ambiguities between the UE 120 and a base station 110 regarding PUCCH timing may be reduced or eliminated.

Although some operations are described herein in connection with a pair of corresponding PDCCH candidates, similar operations may be performed in connection with a set of corresponding PDCCH candidates, such as 3 PDCCH candidates from 3 different CORESETs (e.g., corresponding to 3 different TRPs), 4 PDCCH candidates from 4 different CORESETs (e.g., corresponding to 4 different TRPs), and/or the like. Additionally, or alternatively, although the indication of example 600 shows multiple pairs of corresponding PDCCH candidates, similar operations may be performed in connection with a single pair of corresponding PDCCH candidates (e.g., for an aggregation level of 1).

As indicated above, FIG. 6 is provided as an example. Other examples are possible and may differ from what was described with respect to FIG. 6.

Figure 7:
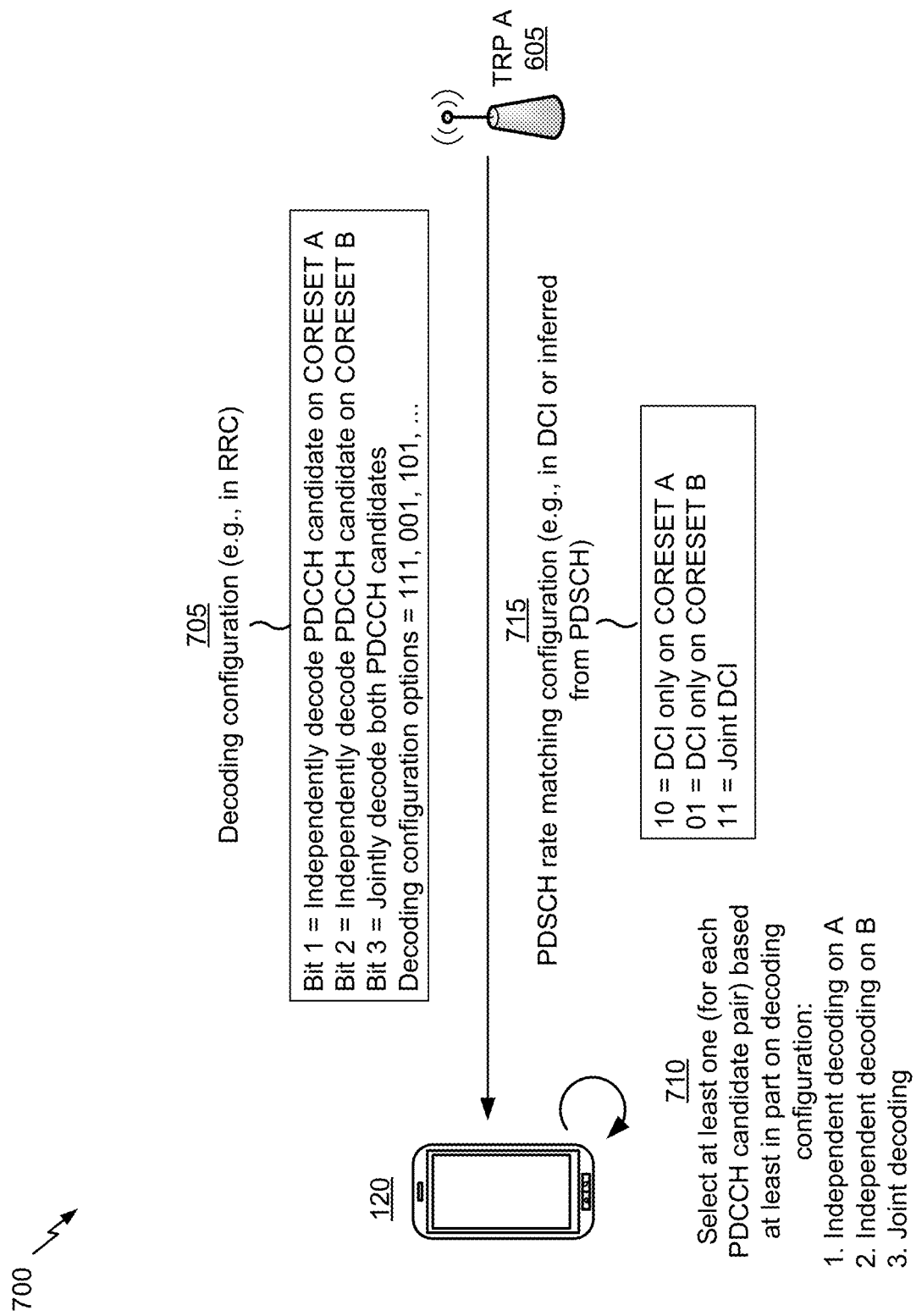

FIG. 7 is a diagram illustrating an example 700 relating to downlink control for multiple TRP configurations, in accordance with various aspects of the present disclosure. FIG. 7 provides additional details of the operations of FIG. 6. For example, a configuration described in connection with FIG. 7 may be used by the UE 120 to determine one or more decoding operations to be performed on a pair of PDCCH candidates, as described above in connection with reference number 640 of FIG. 6.

As shown by reference number 705, the first TRP 605 (and/or the second TRP 610) may transmit a configuration to the UE 120. In some aspects, this configuration may be referred to as a decoding configuration because the configuration indicates a manner in which the UE 120 is to attempt blind decoding of pairs of PDCCH candidates. In some aspects, the decoding configuration may be semi-statically configured, and/or may be indicated in an RRC message.

In some aspects, the decoding configuration may indicate that the UE 120 is to independently decode a first PDCCH candidate on CORESET A, independently decode a second PDCCH candidate on CORESET B, and jointly decode the first PDCCH candidate and the second PDCCH candidate. In this case, the UE 120 may attempt 3 blind decoding operations per PDCCH candidate pair. As shown, this decoding configuration may be indicated using a bitmap of 111, where the first bit indicates whether to independently decode a PDCCH candidate on CORESET A, the second bit indicates whether to independently decode a PDCCH candidate on CORESET B, and the third bit indicates whether to jointly decode both PDCCH candidates of the PDCCH candidate pair.

In some aspects, the decoding configuration may indicate that the UE 120 is to only jointly decode the first PDCCH candidate on CORESET A and the second PDCCH candidate CORESET B without independently decoding the first PDCCH candidate on CORESET A or independently decoding the second PDCCH candidate on CORESET B. In this case, the UE 120 may attempt 1 blind decoding operation per PDCCH candidate pair. As shown, this decoding configuration may be indicated using a bitmap of 001, using the bit indications described above.

In some aspects, the decoding configuration may indicate that the UE 120 is to independently decode the first PDCCH candidate on CORESET A and jointly decode the first PDCCH candidate on CORESET A and the second PDCCH candidate on CORESET B without independently and separately decoding the second PDCCH candidate on CORESET B. For example, CORESET A may be a primary CORESET, and CORESET B may be an assisting CORESET. In this case, the UE 120 may attempt 2 blind decoding operations per PDCCH candidate pair. As shown, this decoding configuration may be indicated using a bitmap of 101, using the bit indications described above.

As shown by reference number 710, the UE 120 may selectively perform at least one of independent decoding of a first PDCCH candidate of a PDCCH candidate pair, independent decoding of a second PDCCH candidate of a PDCCH candidate pair, or joint decoding of both the first PDCCH candidate and the second PDCCH candidate based at least in part on the decoding configuration, in a similar manner as described above in connection with FIG. 6. In this way, multi-TRP communications (e.g., coordinated multi-point communications) may be dynamically configured with fewer errors due to reduced ambiguity between the UE 120 and the TRPs.

As shown by reference number 715, in some aspects, a PDSCH rate matching configuration may be dynamically configured. The PDSCH rate matching configuration may be used to identify and/or resolve errors, such as when the TRPs transmit DCI on both CORESETs, but the UE 120 only receives DCI on one of the CORESETs. For example, the PDSCH rate matching configuration may be explicitly indicated in DCI, may be implicitly indicated (e.g., using a PDSCH configuration relating to multiple TRPs), and/or the like. As shown, the first TRP 605 (and/or the second TRP 610) may transmit the PDSCH rate matching configuration to the UE 120. The PDSCH rate matching configuration may indicate that DCI was transmitted on a PDCCH candidate only on CORESET A (e.g., using a bitmap of 10), that DCI was transmitted on a PDCCH candidate only on CORESET B (e.g., using a bitmap of 01), or that DCI was jointly transmitted on the corresponding PDCCH candidates on both CORESETs (e.g., using a bitmap of 11). In some aspects, the PDSCH rate matching configuration may be indicated using a bitmap, such as a 2-bit bitmap, as shown. The PDSCH rate matching configuration may be used to determine a manner in which the PDSCH is to be rated matched around the PDCCH, as described in more detail below in connection with FIG. 9.

Although some operations are described herein in connection with a pair of corresponding PDCCH candidates, similar operations may be performed in connection with a set of corresponding PDCCH candidates, such as 3 PDCCH candidates from 3 different CORESETs (e.g., corresponding to 3 different TRPs), 4 PDCCH candidates from 4 different CORESETs (e.g., corresponding to 4 different TRPs), and/or the like. For example, different bitmap sizes and/or decoding configurations may be indicated for different sized sets of corresponding PDCCH candidates, so as to indicate a manner in which all of the corresponding PDCCH candidates, in a set, are to be decoded.

As indicated above, FIG. 7 is provided as an example. Other examples are possible and may differ from what was described with respect to FIG. 7.

Figure 8:
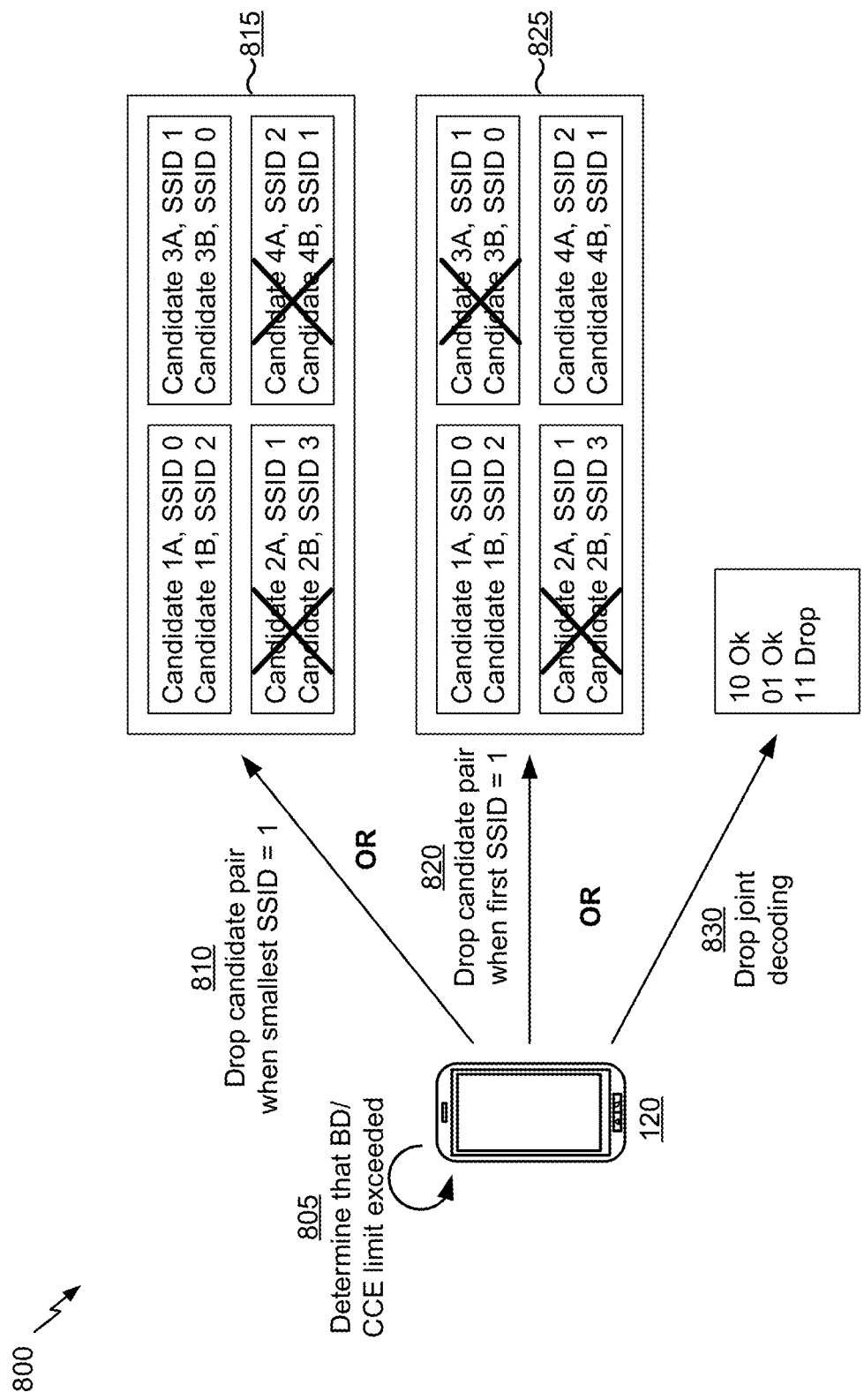

FIG. 8 is a diagram illustrating an example 800 relating to downlink control for multiple TRP configurations, in accordance with various aspects of the present disclosure. FIG. 8 shows example dropping rules that may be applied by a UE 120 when a blind decoding (BD) and/or control channel element (CCE) limit is satisfied and/or exceeded for the UE 120. In some aspects, the BD and/or CCE limit may be configured for a primary cell (PCell) and/or a primary secondary cell (PSCell), and not for a secondary cell (SCell).

As shown by reference number 805, the UE 120 may determine that a BD or CCE limit, configured for the UE 120, is exceeded. For example, the UE 120 may calculate a number of BD attempts to be performed, a number of CCEs to be decoded, and/or the like, and may determine that the number exceeds a BD or CCE limit configured for the UE 120. In some aspects, the BD or CCE limit may be larger when the UE 120 is configured to monitor multiple CORESETs for multi-TRP communications (e.g., according to techniques described herein) as compared to a BD or CCE limit configured for the UE 120 when the UE is not configured to monitor multiple CORESETs for multi-TRP communications (e.g., when the UE 120 is configured to monitor a single CORESET and/or is configured for communication with a single TRP and/or base station 110).

When the calculated number exceeds the BD or CCE limit, then the UE 120 may identify one or more particular pairs of PDCCH candidates to be dropped so that the BD or CCE limit is not exceeded. The UE 120 may apply a dropping rule to identify the pairs of PDCCH candidates to be dropped, as described below. The dropping rule may be preconfigured or predetermined for the UE 120 (e.g., based at least in part on a 3GPP standard), and/or may be indicated to the UE 120 by a base station 110 (e.g., a TRP and/or the like). In some aspects, the dropping rule may be based at least in part on a search space identifier (SSID), which may be used to determine which PDCCH candidate pair(s) are to be dropped.

For example 800, four PDCCH candidate pairs exist (e.g., continuing with the example from reference number 620 of FIG. 6), shown as a first pair of candidate 1A and candidate 1B, a second pair of candidate 2A and 2B, a third pair of candidate 3A and 3B, and a fourth pair of candidate 4A and 4B.

As shown by reference number 810, in some aspects, the dropping rule may indicate that when a smallest SSID, corresponding to one of the PDCCH candidates in the pair, matches a particular SSID, then that pair is to be dropped. For example, a pair of PDCCH candidates may be dropped if the smallest SSID associated with the pair matches an SSID of 1. In this case, and as shown by reference number 815, the second pair (with SSIDs of 1 and 3) and the fourth pair (with SSIDs of 2 and 1) may be dropped, and the first pair and the third pair may be decoded. Although the third pair includes a PDCCH candidate associated with an SSID of 1, there is a smaller SSID associated with the third pair (SSID 0), and so the third pair is not dropped. In this case, the TRP(s) may apply a similar dropping rule, and may not transmit using PDCCH candidates from the second pair or the fourth pair to avoid wasting resources.

As shown by reference number 820, in some aspects, the dropping rule may indicate that when a first SSID, corresponding to the PDCCH candidate indicated first in the pair (e.g., indicated and/or listed before the other PDCCH candidate in the indication described above in connection with reference number 615 of FIG. 6), matches a particular SSID, then that pair is to be dropped. For example, a pair of PDCCH candidates may be dropped if the first SSID associated with the pair matches an SSID of 1. In this case, and as shown by reference number 825, the second pair (with SSIDs of 1 and 3) and the third pair (with SSIDs of 1 and 0) may be dropped, and the first pair and the fourth pair may be decoded. Although the fourth pair includes a PDCCH candidate associated with an SSID of 1, this SSID is associated with the PDCCH candidate that is listed second in the indication (e.g., candidate 4B, where candidate 4A is listed first, before candidate 4B), and so the fourth pair is not dropped. In this case, the TRP(s) may apply a similar dropping rule, and may not transmit using PDCCH candidates from the second pair or the third pair to avoid wasting resources.

In some aspects, the dropping rule may be based at least in part on a priority associated with an SSID. For example, a smaller SSID may have a higher priority. For pairs (or sets) of PDCCH candidates, the smallest SSID among the pair may indicate the priority for the pair. Alternatively, the first SSID listed in the indication may indicate the priority for the pair. In this way, a single SSD may be selected for the pair to determine a dropping priority associated with the pair.

For example, when the smallest SSID in the pair indicates the priority for the pair, the priority, from highest to lowest, may be the third pair (with a smallest SSID of 0, and a next smallest of 1), the first pair (with a smallest SSID of 0 and a next smallest of 2), the fourth pair (with a smallest SSID of 1 and a next smallest of 2), and the second pair (with a smallest SSID of 1 and a next smallest of 3). Alternatively, the first and third pairs may have a same higher priority (e.g., due to the same smallest SSID), and the second and fourth pairs may have a same lower priority (e.g., due to the same smallest SSID).

As another example, when the first SSID in the pair indicates the priority for the pair, the priority, from highest to lowest, may be the first pair (with a first SSID of 0), the third pair (with a first SSID of 1, and a second SSID of 0), the second pair (with a first SSID of 1 and a second SSID of 3), and the fourth pair (with a first SSID of 2). Alternatively, the second and third pairs may have a same priority (e.g., due to the same first SSID).

As shown by reference number 830, in some aspects, the dropping rule may indicate that joint decoding of one or more PDCCH candidate pairs is to be dropped before independent decoding of the PDCCH candidates included in those pair(s). For example, the UE 120 may independently decode each PDCCH candidate (e.g., 1A through 4B) from the PDCCH candidate pairs without applying joint decoding of any of the PDCCH candidate pairs. This may reduce the number of BD and/or CCE attempts by the number of PDCCH candidate pairs to be decoded. In this case, the TRP(s) may apply a similar dropping rule, and may not jointly transmit when the BD and/or CCE limit is exceeded to avoid wasting resources.

In some aspects, the joint decoding dropping rule described in connection with reference number 830 may be applied in combination with one of the dropping rules described in connection with reference numbers 810-820 (e.g., using SSID matching) to drop joint decoding for some, but not all, of the PDCCH candidate pairs. In this case, the TRP(s) may apply a similar dropping rule, and may not jointly transmit for those PDCCH candidate pairs to avoid wasting resources.

Although some operations are described herein in connection with a pair of corresponding PDCCH candidates, similar operations may be performed in connection with a set of corresponding PDCCH candidates, such as 3 PDCCH candidates from 3 different CORESETs (e.g., corresponding to 3 different TRPs), 4 PDCCH candidates from 4 different CORESETs (e.g., corresponding to 4 different TRPs), and/or the like. For example, the dropping rule may apply to the smallest SSID associated with the set (e.g., when the set is not a pair), the first SSID listed in the indication, and/or the like.

As indicated above, FIG. 8 is provided as an example. Other examples are possible and may differ from what was described with respect to FIG. 8.

Figure 9:
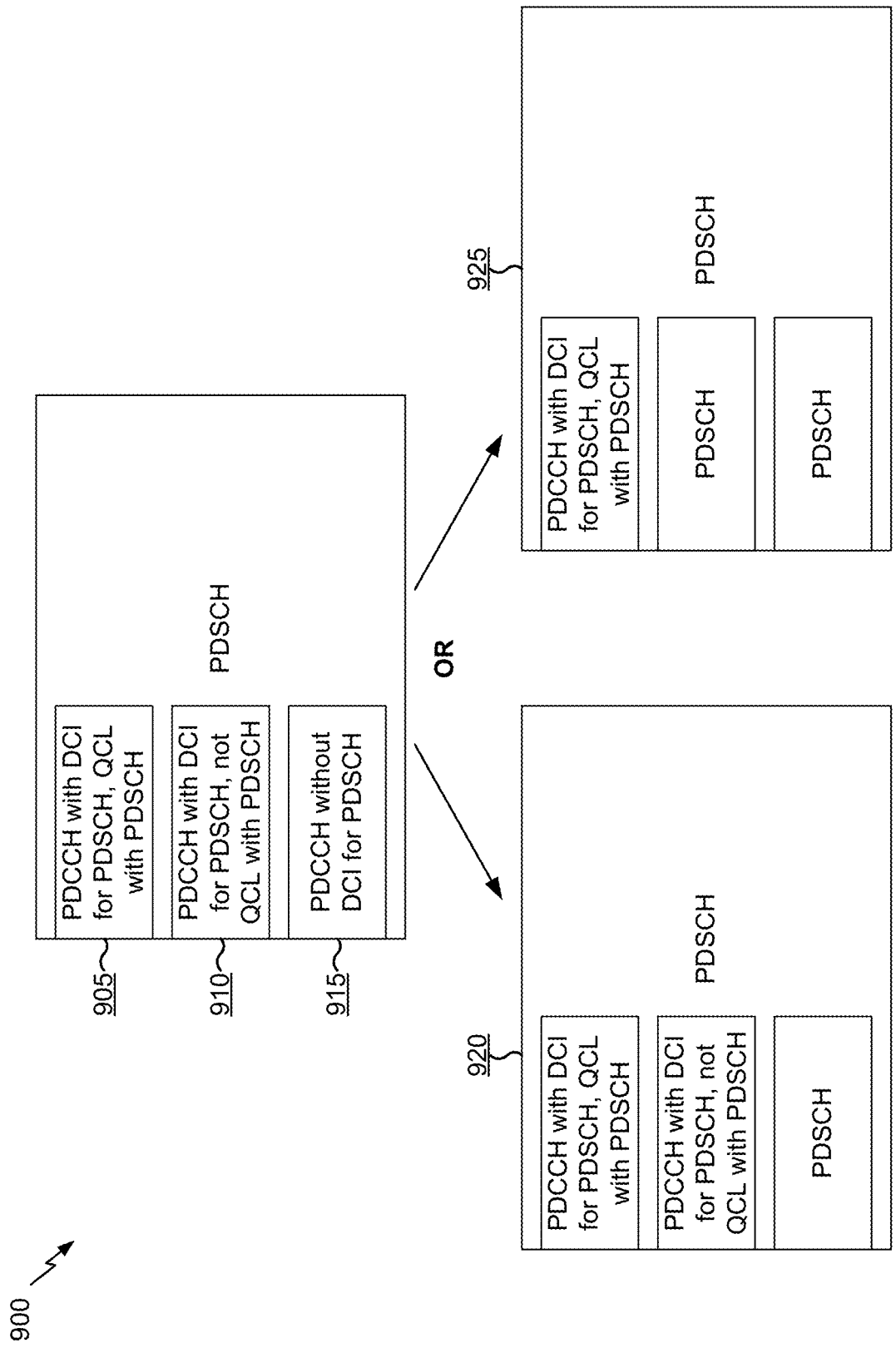

FIG. 9 is a diagram illustrating an example 900 relating to downlink control for multiple TRP configurations, in accordance with various aspects of the present disclosure. FIG. 9 shows examples of how a PDSCH may be rate matched around one or more PDCCHs (e.g., for flexible reconfiguration of one or more CORESETs that include the one or more PDCCHs).

As shown by reference number 905, a CORESET may include a first PDCCH that includes DCI for scheduling a PDSCH, and the first PDCCH may be quasi co-located with the PDSCH. As shown by reference number 910, a CORESET may include a second PDCCH that includes DCI for scheduling the PDSCH, and the second PDCCH may not be quasi co-located with the PDSCH. As shown by reference number 915, a CORESET may include a third PDCCH that does not include DCI for scheduling the PDSCH. When two channels (or beams) are quasi co-located, one or more properties of one of the channels (or beams) can be used to infer the corresponding one or more properties of the other channel (or beam), such as a delay spread, a Doppler spread, a frequency shift, an average gain, an average delay, an average received power, a received timing, and/or the like.

As shown by reference number 920, in some aspects, the PDSCH may be rate matched around all PDCCHs that include DCI with scheduling information for the PDSCH. In this case, the PDSCH may be rate matched around the first PDCCH and the second PDCCH, both of which include DCI with scheduling information for the PDSCH. In some aspects, the third PDCCH may be reconfigured to carry the PDSCH.

In some aspects, the PDSCH is rate matched around a first PDCCH, corresponding to a first PDCCH candidate of a PDCCH candidate pair, and a second PDCCH corresponding to a second PDCCH candidate of the PDCCH candidate pair. In some aspects, rate matching may be performed in this manner regardless of a decoding outcome (e.g., regardless of whether joint decoding succeeds or fails, regardless of whether each independent decoding succeeds or fails, and/or the like) when joint decoding is configured for the UE. Additionally, or alternatively, rate matching may be performed in this manner regardless of whether the first PDCCH and the second PDCCH carry DCI with scheduling information for the PDSCH, regardless of whether the first PDSCH and the second PDCCH are both quasi co-located with the PDSCH, and/or the like. In this way, ambiguities and/or mismatches between the UE 120 and the base station 110 (e.g., TRP), with regard to rate matching, may be reduced.

As shown by reference number 925, in some aspects, the PDSCH may be rate matched around all PDCCHs that include DCI with scheduling information for the PDSCH and that are quasi co-located with the PDSCH. In this case, the PDSCH may be rate matched around the first PDCCH, which includes DCI with scheduling information for that PDCCH and which is quasi co-located with the PDSCH. Additionally, or alternatively, the PDSCH may not be rate matched around the second PDCCH, which includes DCI with scheduling information for that PDCCH, but which is not quasi co-located with the PDSCH. In some aspects, the second PDCCH and the third PDCCH may be reconfigured to carry the PDSCH.

In some aspects, if the CORESET includes one or more wideband reference signals (e.g., a wideband demodulation reference signal (DMRS) and/or the like), the PDSCH may be rate matched around one or more PDCCHs (e.g., using a technique described above) and the one or more wideband reference signals. In some aspects, the PDSCH may be rate matched around one or more wideband reference signals corresponding to the one or more PDCCHs around which the PDSCH is to be rate matched.

In some aspects, the UE 120 may determine the PDSCH rate matching scheme based at least in part on a decoding configuration indicated in DCI (e.g., explicitly or implicitly), as described above in connection with reference number 710 of FIG. 7. For example, the decoding configuration may indicate which PDCCHs and/or PDCCH candidates carry DCI for the PDSCH, and the UE 120 may rate match the PDSCH around one or more of those PDCCHs according to a rate matching scheme described above. In this way, ambiguities and/or mismatches between the UE 120 and the base station 110 (e.g., TRP), with regard to rate matching, may be reduced by indicating the PDCCHs with DCI in case the UE 120 does not correctly receive DCI in one or more of the PDCCHs (e.g., due to propagation loss and/or the like).

As indicated above, FIG. 9 is provided as an example. Other examples are possible and may differ from what was described with respect to FIG. 9.

Figure 10:
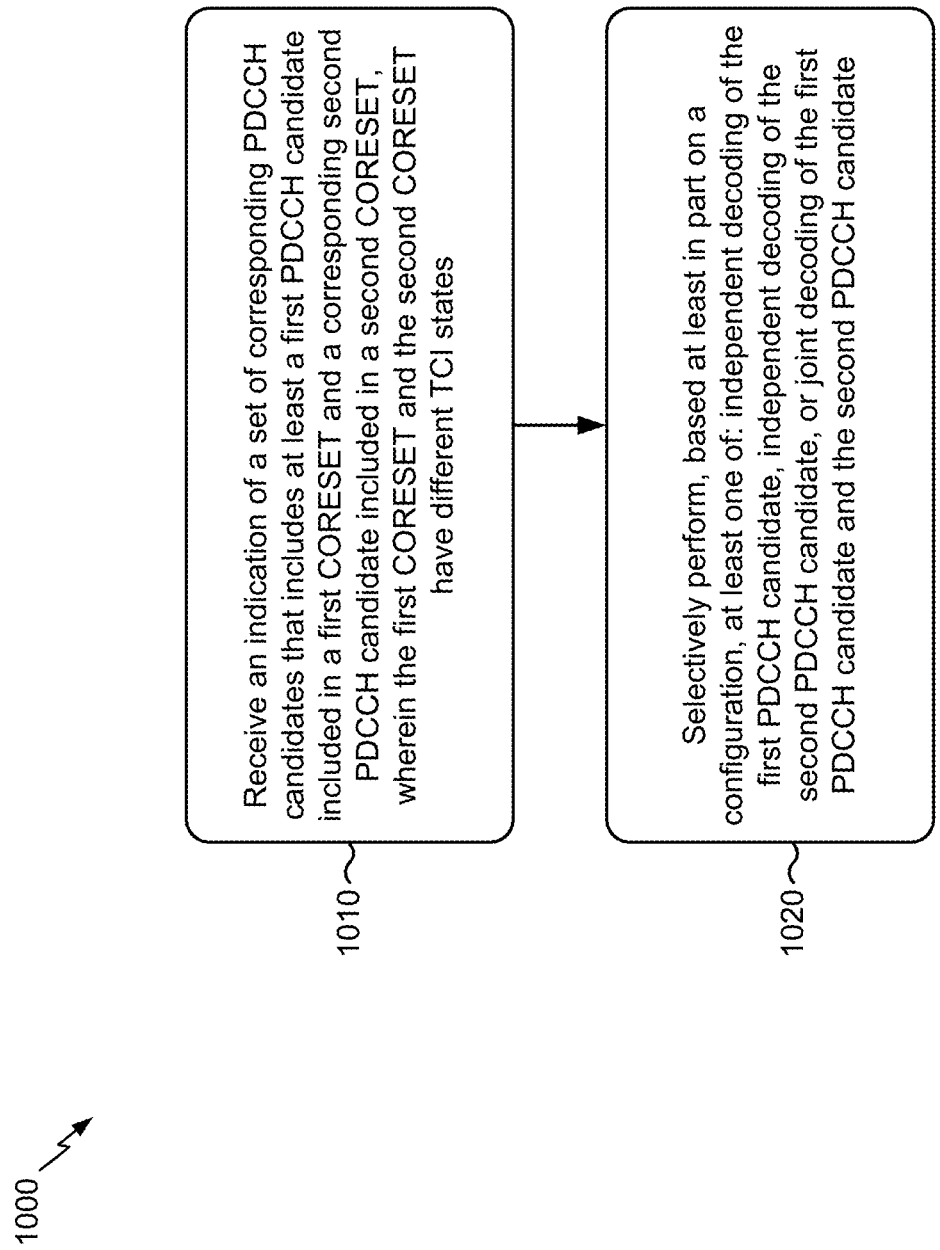
FIGS. 10 and 11 are diagrams illustrating example processes relating to downlink control for multiple transmit receive point (TRP) configurations, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations relating to downlink control for multiple TRP configurations.

As shown in FIG. 10, in some aspects, process 1000 may include receiving an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states (block 1010). For example, the UE (e.g., using antenna 252, DEMOD 254, MIMO detector 256, receive processor 258, controller/processor 280, and/or the like) may receive an indication of a set of corresponding PDCCH candidates that includes at least a first PDCCH candidate included in a first CORESET and a corresponding second PDCCH candidate included in a second CORESET, as described above in connection with FIGS. 6-9. In some aspects, the first CORESET and the second CORESET have different TCI states.

As further shown in FIG. 10, in some aspects, process 1000 may include selectively performing, based at least in part on a configuration, at least one of: independent decoding of the first PDCCH candidate, independent decoding of the second PDCCH candidate, or joint decoding of the first PDCCH candidate and the second PDCCH candidate (block 1020). For example, the UE (e.g., using antenna 252, DEMOD 254, MIMO detector 256, receive processor 258, controller/processor 280, and/or the like) may selectively perform, based at least in part on a configuration, at least one of: independent decoding of the first PDCCH candidate, independent decoding of the second PDCCH candidate, or joint decoding of the first PDCCH candidate and the second PDCCH candidate, as described above in connection with FIGS. 6-9.

Process 1000 may include additional aspects, such as any single aspect or any combination of aspects described below and/or in connection with one or more other processes described elsewhere herein.

In a first aspect, the indication identifies multiple sets of corresponding PDCCH candidates, wherein each set of corresponding PDCCH candidates includes a PDCCH candidate, from the first CORESET, that corresponds to another PDCCH candidate from the second CORESET.

In a second aspect, alone or in combination with the first aspect, each set of corresponding PDCCH candidates includes only a pair of corresponding PDCCH candidates.

In a third aspect, alone or in combination with one or more of the first and second aspects, downlink control information is the same for a first PDCCH corresponding to the first PDCCH candidate and a second PDCCH corresponding to the second PDCCH candidate.

In a fourth aspect, alone or in combination with one or more of the first through third aspects, the first PDCCH candidate and the second PDCCH candidate are associated with a same aggregation level.

In a fifth aspect, alone or in combination with one or more of the first through fourth aspects, the first PDCCH candidate and the second PDCCH candidate are associated with different aggregation levels.

In a sixth aspect, alone or in combination with one or more of the first through fifth aspects, the indication of the set of corresponding PDCCH candidates is received via a radio resource control (RRC) message.

In a seventh aspect, alone or in combination with one or more of the first through sixth aspects, the configuration is indicated via a radio resource control (RRC) message.

In an eighth aspect, alone or in combination with one or more of the first through seventh aspects, the configuration indicates that the UE is to independently decode the first PDCCH candidate, independently decode the second PDCCH candidate, and jointly decode the first PDCCH candidate and the second PDCCH candidate.

In a ninth aspect, alone or in combination with one or more of the first through eighth aspects, the configuration indicates that the UE is to only jointly decode the first PDCCH candidate and the second PDCCH candidate without independently decoding the first PDCCH candidate or independently decoding the second PDCCH candidate.

In a tenth aspect, alone or in combination with one or more of the first through ninth aspects, the configuration indicates that the UE is to independently decode the first PDCCH candidate and jointly decode the first PDCCH candidate and the second PDCCH candidate without independently decoding the second PDCCH candidate.

In an eleventh aspect, alone or in combination with one or more of the first through tenth aspects, the first CORESET and the second CORESET include a same number of PDCCH candidates.

In a twelfth aspect, alone or in combination with one or more of the first through eleventh aspects, each PDCCH candidate from the first CORESET maps to one respective PDCCH candidate from the second CORESET, and wherein each PDCCH candidate from the second CORESET maps to one respective PDCCH candidate from the first CORESET.

In a thirteenth aspect, alone or in combination with one or more of the first through twelfth aspects, the first CORESET and the second CORESET include a different number of PDCCH candidates.

In a fourteenth aspect, alone or in combination with one or more of the first through thirteenth aspects, at least one PDCCH candidate from the first CORESET maps to multiple PDCCH candidates from the second CORESET, or wherein at least one PDCCH candidate from the second CORESET maps to multiple PDCCH candidates from the first CORESET.

In a fifteenth aspect, alone or in combination with one or more of the first through fourteenth aspects, a blind decoding (BD) or control channel element (CCE) limit, configured for the UE, is larger when the UE is configured to monitor multiple CORESETs as compared to a BD or CCE limit configured for the UE when the UE is configured to monitor a single CORESET.

In a sixteenth aspect, alone or in combination with one or more of the first through fifteenth aspects, a particular set of corresponding PDCCH candidates is dropped based at least in part on a blind decoding (BD) or control channel element (CCE) limit and a determination that a particular PDCCH candidate, included in the particular set, is associated with a search space identifier of a search space for which PDCCH candidates are to be dropped.

In a seventeenth aspect, alone or in combination with one or more of the first through sixteenth aspects, the particular PDCCH candidate is associated with a smallest search space identifier among PDCCH candidates in the particular set of corresponding PDCCH candidates.

In an eighteenth aspect, alone or in combination with one or more of the first through seventeenth aspects, the particular PDCCH candidate is indicated, in the indication of the set of corresponding PDCCH candidates, before all other PDCCH candidates in the particular set of corresponding PDCCH candidates.

In a nineteenth aspect, alone or in combination with one or more of the first through eighteenth aspects, joint decoding of one or more sets of corresponding PDCCH candidates is dropped before independent decoding of the one or more sets of corresponding PDCCH candidates based at least in part on a blind decoding (BD) or control channel element (CCE) limit.

In a twentieth aspect, alone or in combination with one or more of the first through nineteenth aspects, a blind decoding (BD) or control channel element (CCE) limit is configured for the UE for at least one of a primary cell (PCell) or a primary secondary cell (PSCell), and not for a secondary cell (SCell).

In a twenty-first aspect, alone or in combination with one or more of the first through twentieth aspects, a physical downlink shared channel (PDSCH) is rate matched around all PDCCHs that include downlink control information (DCI) with scheduling information for the PDSCH.

In a twenty-second aspect, alone or in combination with one or more of the first through twenty-first aspects, a physical downlink shared channel (PDSCH) is rate matched around a first PDCCH corresponding to the first PDCCH candidate and a second PDCCH corresponding to the second PDCCH candidate.

In a twenty-third aspect, alone or in combination with one or more of the first through twenty-second aspects, the PDSCH is rate matched around the first PDCCH and the second PDCCH regardless of a decoding outcome when joint decoding is configured for the UE.

In a twenty-fourth aspect, alone or in combination with one or more of the first through twenty-third aspects, a physical downlink shared channel (PDSCH) is rate matched around all PDCCHs that include downlink control information (DCI) with scheduling information for the PDSCH and that are quasi co-located with the PDSCH.

In a twenty-fifth aspect, alone or in combination with one or more of the first through twenty-fourth aspects, a physical downlink shared channel (PDSCH) is rate matched around one or more PDCCHs and one or more corresponding wideband demodulation reference signals.

In a twenty-sixth aspect, alone or in combination with one or more of the first through twenty-fifth aspects, the configuration is explicitly indicated in downlink control information (DCI).

In a twenty-seventh aspect, alone or in combination with one or more of the first through twenty-sixth aspects, the configuration is determined based at least in part on a physical downlink shared channel (PDSCH) configuration.

In a twenty-eighth aspect, alone or in combination with one or more of the first through twenty-seventh aspects, resources of a physical uplink control channel (PUCCH) are determined based at least in part on one or more of: a PDCCH corresponding to a PDCCH candidate that is indicated first in the indication of the set of corresponding PDCCH candidates, a timing of an earliest PDCCH associated with the set of corresponding PDCCH candidates, a timing of a latest PDCCH associated with the set of corresponding PDCCH candidates, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
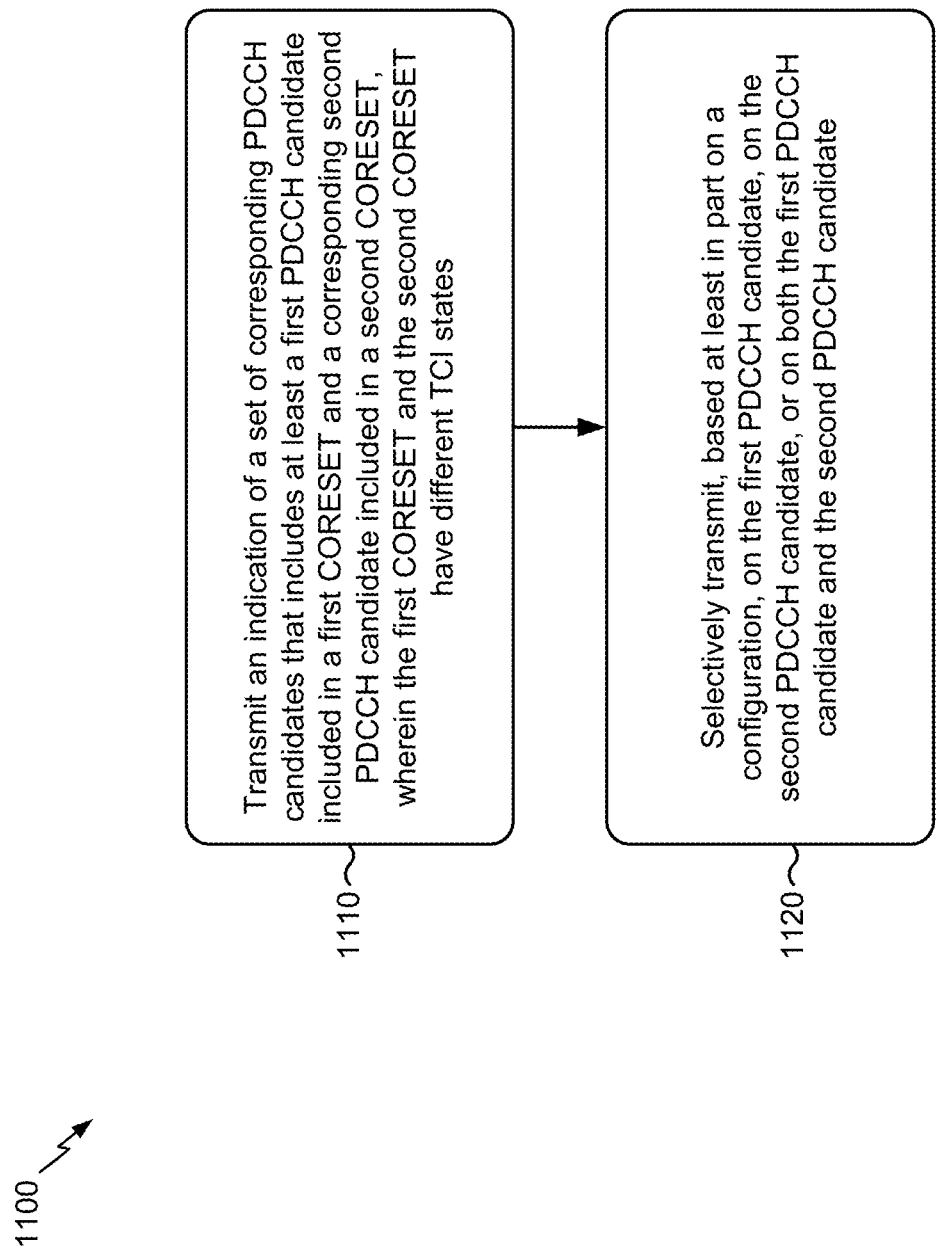

FIG. 11 is a diagram illustrating an example process 1100 performed, for example, by a base station, in accordance with various aspects of the present disclosure. Example process 1100 is an example where a base station (e.g., base station 110, TRP 605, TRP 610, and/or the like) performs operations relating to downlink control for multiple TRP configurations.

As shown in FIG. 11, in some aspects, process 1100 may include transmitting an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states (block 1110). For example, the base station (e.g., using controller/processor 240, transmit processor 220, TX MIMO processor 230, MOD 232, antenna 234, and/or the like) may transmit an indication of a set of corresponding PDCCH candidates that includes at least a first PDCCH candidate included in a first CORESET and a corresponding second PDCCH candidate included in a second CORESET, as described above in connection with FIGS. 6-9. In some aspects, the first CORESET and the second CORESET have different TCI states.

As further shown in FIG. 11, in some aspects, process 1100 may include selectively transmitting, based at least in part on a configuration, on the first PDCCH candidate, on the second PDCCH candidate, or on both the first PDCCH candidate and the second PDCCH candidate (block 1120). For example, the base station (e.g., using controller/processor 240, transmit processor 220, TX MIMO processor 230, MOD 232, antenna 234, and/or the like) may selectively transmit, based at least in part on a configuration, on the first PDCCH candidate, on the second PDCCH candidate, or on both the first PDCCH candidate and the second PDCCH candidate, as described above in connection with FIGS. 6-9.

Process 1100 may include additional aspects, such as any single aspect or any combination of aspects described below and/or in connection with one or more other processes described elsewhere herein.

In a first aspect, the indication identifies multiple sets of corresponding PDCCH candidates, wherein each set of corresponding PDCCH candidates includes a PDCCH candidate, from the first CORESET, that corresponds to another PDCCH candidate from the second CORESET.

In a second aspect, alone or in combination with the first aspect, each set of corresponding PDCCH candidates includes only a pair of corresponding PDCCH candidates.

In a third aspect, alone or in combination with one or more of the first and second aspects, downlink control information is the same for a first PDCCH corresponding to the first PDCCH candidate and a second PDCCH corresponding to the second PDCCH candidate.

In a fourth aspect, alone or in combination with one or more of the first through third aspects, the first PDCCH candidate the second PDCCH candidate are associated with a same aggregation level.

In a fifth aspect, alone or in combination with one or more of the first through fourth aspects, the first PDCCH candidate and the second PDCCH candidate are associated with different aggregation levels.

In a sixth aspect, alone or in combination with one or more of the first through seventh aspects, the indication of the set of corresponding PDCCH candidates is transmitted via a radio resource control (RRC) message.

In a seventh aspect, alone or in combination with one or more of the first through sixth aspects, the configuration is transmitted to a user equipment (UE) via a radio resource control (RRC) message.

In an eighth aspect, alone or in combination with one or more of the first through seventh aspects, the configuration indicates that a user equipment (UE) is to independently decode the first PDCCH candidate, independently decode the second PDCCH candidate, and jointly decode the first PDCCH candidate and the second PDCCH candidate.

In a ninth aspect, alone or in combination with one or more of the first through eighth aspects, the configuration indicates that a user equipment (UE) is to only jointly decode the first PDCCH candidate and the second PDCCH candidate without independently decoding the first PDCCH candidate or independently decoding the second PDCCH candidate.

In a tenth aspect, alone or in combination with one or more of the first through ninth aspects, the configuration indicates that a user equipment (UE) is to independently decode the first PDCCH candidate and jointly decode the first PDCCH candidate and the second PDCCH candidate without independently decoding the second PDCCH candidate.

In an eleventh aspect, alone or in combination with one or more of the first through tenth aspects, the first CORESET and the second CORESET include a same number of PDCCH candidates.

In a twelfth aspect, alone or in combination with one or more of the first through eleventh aspects, each PDCCH candidate from the first CORESET maps to one respective PDCCH candidate from the second CORESET, and wherein each PDCCH candidate from the second CORESET maps to one respective PDCCH candidate from the first CORESET.

In a thirteenth aspect, alone or in combination with one or more of the first through twelfth aspects, the first CORESET and the second CORESET include a different number of PDCCH candidates.

In a fourteenth aspect, alone or in combination with one or more of the first through thirteenth aspects, at least one PDCCH candidate from the first CORESET maps to multiple PDCCH candidates from the second CORESET, or wherein at least one PDCCH candidate from the second CORESET maps to multiple PDCCH candidates from the first CORESET.

In a fifteenth aspect, alone or in combination with one or more of the first through fourteenth aspects, a blind decoding (BD) or control channel element (CCE) limit is larger when the base station is configured for multiple CORESETs as compared to a BD or CCE limit configured when the base station is configured for a single CORESET.

In a sixteenth aspect, alone or in combination with one or more of the first through fifteenth aspects, a particular set of corresponding PDCCH candidates is dropped based at least in part on a blind decoding (BD) or control channel element (CCE) limit and a determination that a particular PDCCH candidate, included in the particular set, is associated with a search space identifier of a search space for which PDCCH candidates are to be dropped.

In a seventeenth aspect, alone or in combination with one or more of the first through sixteenth aspects, the particular PDCCH candidate is associated with a smallest search space identifier among PDCCH candidates in the particular set of corresponding PDCCH candidates.

In an eighteenth aspect, alone or in combination with one or more of the first through seventeenth aspects, the particular PDCCH candidate is indicated, in the indication of the set of corresponding PDCCH candidates, before all other PDCCH candidates in the particular set of corresponding PDCCH candidates.

In a nineteenth aspect, alone or in combination with one or more of the first through eighteenth aspects, joint decoding of one or more sets of corresponding PDCCH candidates is dropped before independent decoding of the one or more sets of corresponding PDCCH candidates based at least in part on a blind decoding (BD) or control channel element (CCE) limit.

In a twentieth aspect, alone or in combination with one or more of the first through nineteenth aspects, a blind decoding (BD) or control channel element (CCE) limit is configured for at least one of a primary cell (PCell) or a primary secondary cell (PSCell), and not for a secondary cell (SCell).

In a twenty-first aspect, alone or in combination with one or more of the first through twentieth aspects, a physical downlink shared channel (PDSCH) is rate matched around all PDCCHs that include downlink control information (DCI) with scheduling information for the PDSCH.

In a twenty-second aspect, alone or in combination with one or more of the first through twenty-first aspects, a physical downlink shared channel (PDSCH) is rate matched around a first PDCCH corresponding to the first PDCCH candidate and a second PDCCH corresponding to the second PDCCH candidate.

In a twenty-third aspect, alone or in combination with one or more of the first through twenty-second aspects, the PDSCH is rate matched around the first PDCCH and the second PDCCH when joint decoding is configured.

In a twenty-fourth aspect, alone or in combination with one or more of the first through twenty-third aspects, a physical downlink shared channel (PDSCH) is rate matched around all PDCCHs that include downlink control information (DCI) with scheduling information for the PDSCH and that are quasi co-located with the PDSCH.

In a twenty-fifth aspect, alone or in combination with one or more of the first through twenty-fourth aspects, a physical downlink shared channel (PDSCH) is rate matched around one or more PDCCHs and one or more corresponding wideband demodulation reference signals.

In a twenty-sixth aspect, alone or in combination with one or more of the first through twenty-fifth aspects, the configuration is explicitly indicated to a user equipment (UE) in downlink control information (DCI).

In a twenty-seventh aspect, alone or in combination with one or more of the first through twenty-sixth aspects, the configuration is indicated to a user equipment (UE) using a physical downlink shared channel (PDSCH) configuration.

In a twenty-eighth aspect, alone or in combination with one or more of the first through twenty-seventh aspects, resources of a physical uplink control channel (PUCCH) are indicated based at least in part on one or more of: a PDCCH corresponding to a PDCCH candidate that is indicated first in the indication of the set of corresponding PDCCH candidates, a timing of an earliest PDCCH associated with the set of corresponding PDCCH candidates, a timing of a latest PDCCH associated with the set of corresponding PDCCH candidates, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving an indication of a set of corresponding physical downlink control channel (PDCCH) candidates that includes at least a first PDCCH candidate included in a first control resource set (CORESET) and a corresponding second PDCCH candidate included in a second CORESET,
wherein the first CORESET and the second CORESET have different transmission configuration indication (TCI) states, and
wherein the indication includes a bitmap; and selectively performing, based at least in part on the bitmap, at least one of:
independent decoding of the first PDCCH candidate,
independent decoding of the corresponding second PDCCH candidate, or
joint decoding of the first PDCCH candidate and the corresponding second PDCCH candidate.

2. The method of claim 1, wherein the indication identifies multiple sets of corresponding PDCCH candidates, wherein each set of corresponding PDCCH candidates includes a PDCCH candidate, from the first CORESET, that corresponds to another PDCCH candidate from the second CORESET.

3. The method of claim 2, wherein each set of corresponding PDCCH candidates includes only a pair of corresponding PDCCH candidates.

4. The method of claim 1, wherein downlink control information is the same for a first PDCCH corresponding to the first PDCCH candidate and a second PDCCH corresponding to the corresponding second PDCCH candidate.

5. The method of claim 1, wherein the first PDCCH candidate and the corresponding second PDCCH candidate are associated with a same aggregation level.

6. The method of claim 1, wherein the first PDCCH candidate and the corresponding second PDCCH candidate are associated with different aggregation levels.

7. The method of claim 1, wherein the indication is received via a radio resource control (RRC) message.

8. The method of claim 1, wherein a first bitmap value indicates that the UE is to independently decode the first PDCCH candidate, independently decode the corresponding second PDCCH candidate, and jointly decode the first PDCCH candidate and the corresponding second PDCCH candidate;
wherein a second bitmap value indicates that the UE is to only jointly decode the first PDCCH candidate and the corresponding second PDCCH candidate without independently decoding the first PDCCH candidate or independently decoding the corresponding second PDCCH candidate; or
wherein a third bitmap value indicates that the UE is to independently decode the first PDCCH candidate and jointly decode the first PDCCH candidate and the corresponding second PDCCH candidate without independently decoding the corresponding second PDCCH candidate.

9. The method of claim 1, wherein each PDCCH candidate from the first CORESET maps to one respective PDCCH candidate from the second CORESET, and wherein each PDCCH candidate from the second CORESET maps to one respective PDCCH candidate from the first CORESET.

10. The method of claim 1, wherein at least one PDCCH candidate from the first CORESET maps to multiple PDCCH candidates from the second CORESET, or wherein at least one PDCCH candidate from the second CORESET maps to multiple PDCCH candidates from the first CORESET.

11. The method of claim 1, wherein a blind decoding (BD) or control channel element (CCE) limit, configured for the UE, is larger when the UE is configured to monitor multiple CORESETs as compared to a BD or CCE limit configured for the UE when the UE is configured to monitor a single CORESET.

12. The method of claim 1, wherein a particular set of corresponding PDCCH candidates is dropped based at least in part on a blind decoding (BD) or control channel element (CCE) limit and a determination that a particular PDCCH candidate, included in the particular set, is associated with a search space identifier of a search space for which PDCCH candidates are to be dropped.

13. The method of claim 12, wherein the particular PDCCH candidate is associated with a smallest search space identifier among PDCCH candidates in the particular set of corresponding PDCCH candidates, or wherein the particular PDCCH candidate is indicated, in the indication, before all other PDCCH candidates in the particular set of corresponding PDCCH candidates.

14. The method of claim 1, wherein joint decoding of one or more sets of corresponding PDCCH candidates is dropped before independent decoding of the one or more sets of corresponding PDCCH candidates based at least in part on a blind decoding (BD) or control channel element (CCE) limit.

15. The method of claim 1, wherein a blind decoding (BD) or control channel element (CCE) limit is configured for the UE for at least one of a primary cell (PCell) or a primary secondary cell (PSCell), and not for a secondary cell (SCell).

16. The method of claim 1, wherein a physical downlink shared channel (PDSCH) is rate matched around all PDCCHs that include downlink control information (DCI) with scheduling information for the PDSCH.

17. The method of claim 1, wherein a physical downlink shared channel (PDSCH) is rate matched around a first PDCCH corresponding to the first PDCCH candidate and a second PDCCH corresponding to the corresponding second PDCCH candidate.

18. The method of claim 17, wherein the PDSCH is rate matched around the first PDCCH and the second PDCCH regardless of a decoding outcome when joint decoding is configured for the UE.

19. The method of claim 1, wherein a physical downlink shared channel (PDSCH) is rate matched around all PDCCHs that include downlink control information (DCI) with scheduling information for the PDSCH and that are quasi co-located with the PDSCH.

20. The method of claim 1, wherein a physical downlink shared channel (PDSCH) is rate matched around one or more PDCCHs and one or more corresponding wideband demodulation reference signals.

21. The method of claim 1, wherein a physical downlink shared channel (PDSCH) rate matching configuration is explicitly indicated in downlink control information (DCI) or is determined based at least in part on a PDSCH configuration.

22. The method of claim 1, wherein resources of a physical uplink control channel (PUCCH) are determined based at least in part on one or more of:
a PDCCH corresponding to a PDCCH candidate that is indicated first in the indication,
a timing of an earliest PDCCH associated with the set of corresponding PDCCH candidates, or
a timing of a latest PDCCH associated with the set of corresponding PDCCH candidates.

23. A method of wireless communication performed by a base station, comprising:
transmitting an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and selectively transmitting, based at least in part on a bitmap, on the first PDCCH candidate, on the corresponding second PDCCH candidate, or on both the first PDCCH candidate and the corresponding second PDCCH candidate.

24. The method of claim 23, wherein the indication identifies multiple sets of corresponding PDCCH candidates, wherein each set of corresponding PDCCH candidates includes a PDCCH candidate, from the first CORESET, that corresponds to another PDCCH candidate from the second CORESET.

25. The method of claim 23, wherein downlink control information is the same for a first PDCCH corresponding to the first PDCCH candidate and a second PDCCH corresponding to the corresponding second PDCCH candidate.

26. The method of claim 23, wherein another bitmap indicates that a user equipment (UE) is to:
  independently decode the first PDCCH candidate, independently decode the corresponding second PDCCH candidate, and jointly decode the first PDCCH candidate and the corresponding second PDCCH candidate;
  only jointly decode the first PDCCH candidate and the corresponding second PDCCH candidate without independently decoding the first PDCCH candidate or independently decoding the corresponding second PDCCH candidate; or
  independently decode the first PDCCH candidate and jointly decode the first PDCCH candidate and the corresponding second PDCCH candidate without independently decoding the corresponding second PDCCH candidate.

27. The method of claim 23, wherein each PDCCH candidate from the first CORESET maps to one respective PDCCH candidate from the second CORESET, and wherein each PDCCH candidate from the second CORESET maps to one respective PDCCH candidate from the first CORESET.

28. The method of claim 23, wherein at least one PDCCH candidate from the first CORESET maps to multiple PDCCH candidates from the second CORESET, or wherein at least one PDCCH candidate from the second CORESET maps to multiple PDCCH candidates from the first CORESET.

29. A user equipment (UE) for wireless communication, comprising:
  memory; and
  one or more processors operatively coupled to the memory, the memory and the one or more processors configured to:
    receive an indication of a set of corresponding physical downlink control channel (PDCCH) candidates that includes at least a first PDCCH candidate included in a first control resource set (CORESET) and a corresponding second PDCCH candidate included in a second CORESET,
      wherein the first CORESET and the second CORESET have different transmission configuration indication (TCI) states, and
      wherein the indication includes a bitmap; and
    selectively perform, based at least in part on the bitmap, at least one of:
      independent decoding of the first PDCCH candidate,
      independent decoding of the corresponding second PDCCH candidate, or
      joint decoding of the first PDCCH candidate and the corresponding second PDCCH candidate.

30. A base station for wireless communication, comprising:
  memory; and
  one or more processors operatively coupled to the memory, the memory and the one or more processors configured to:
    transmit an indication of a set of corresponding physical downlink control channel (PDCCH) candidates that includes at least a first PDCCH candidate included in a first control resource set (CORESET) and a corresponding second PDCCH candidate included in a second CORESET, wherein the first CORESET and the second CORESET have different transmission configuration indication (TCI) states; and
    selectively transmit, based at least in part on a bitmap, on the first PDCCH candidate, on the corresponding second PDCCH candidate, or on both the first PDCCH candidate and the corresponding second PDCCH candidate.

* * * * *